(12) United States Patent
Takakusaki

(10) Patent No.: US 7,058,425 B1
(45) Date of Patent: Jun. 6, 2006

(54) COMMUNICATION APPARATUS AND COMMUNICATION METHOD

(75) Inventor: Keiji Takakusaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/744,029

(22) PCT Filed: May 22, 2000

(86) PCT No.: PCT/JP00/03247

§ 371 (c)(1),
(2), (4) Date: Jan. 19, 2001

(87) PCT Pub. No.: WO00/74265

PCT Pub. Date: Dec. 7, 2000

(30) Foreign Application Priority Data

May 28, 1999 (JP) ............................. 11-149252
Dec. 28, 1999 (JP) ............................. 11-375259

(51) Int. Cl.
*H04M 1/00* (2006.01)

(52) U.S. Cl. .................... 455/561; 455/126; 455/127.2; 455/522

(58) Field of Classification Search ................ 455/126, 455/127.1, 127.2, 561, 522
See application file for complete search history.

(56) References Cited

U.S. PATENT DOCUMENTS

| | | | | |
|---|---|---|---|---|
| 3,900,823 | A | * | 8/1975 | Sokal et al. ................. 330/149 |
| 5,001,675 | A | | 3/1991 | Woodward |
| 5,768,694 | A | * | 6/1998 | Kumagai ..................... 455/126 |
| 5,774,797 | A | * | 6/1998 | Kawano et al. .......... 455/127.2 |
| 6,058,318 | A | | 5/2000 | Kobayakawa et al. |
| 6,275,685 | B1 | * | 8/2001 | Wessel et al. ............... 455/126 |
| 2003/0186725 | A1 | | 10/2003 | Miya |

FOREIGN PATENT DOCUMENTS

| | | |
|---|---|---|
| EP | 0731556 | 9/1996 |
| JP | 05183359 | 7/1993 |
| JP | 5235648 | 9/1993 |
| JP | 5084884 | 11/1993 |
| JP | 7264082 | 10/1995 |
| JP | 8242263 | 9/1996 |
| JP | 9023125 | 1/1997 |
| JP | 10041769 | 2/1998 |
| JP | 10170633 | 6/1998 |
| JP | 10336149 | 12/1998 |
| JP | 11046180 | 2/1999 |
| JP | 00078072 | 3/2000 |

OTHER PUBLICATIONS

Japanese Office Action dated Jun. 1, 2004 with English translation.
PCT International Search Report dated Aug. 8, 2000.

* cited by examiner

*Primary Examiner*—Nguyen T. Vo
*Assistant Examiner*—Nhan T. Le
(74) *Attorney, Agent, or Firm*—Stevens, Davis, Miller & Mosher, LLP

(57) ABSTRACT

Baseband signal generator 107 outputs a transmission baseband signal with a coefficient for setting antenna directivity multiplied and a gain control signal to transmit power amplifier 114 and transmit power amplifier 114 amplifies the transmission baseband signal with a gain corresponding to the gain control signal and transmits the signal from antenna 102. ATT 118 attenuates the output signal of amplifier 114 according to the gain control signal, amplitude/phase comparator 110 calculates amplitude and phase errors between the attenuated signal with a frequency equalized by frequency conversion sections 120 and 121 and the input signal of amplifier 114 and phase/amplitude correction section 108 corrects the transmission baseband signal and gain control signal so as to eliminate the errors. This makes it possible to correct the amplitude and phase shifts of the transmission signal during a communication with other apparatuses and reduce the size and cost of the apparatus.

26 Claims, 19 Drawing Sheets

COMMUNICATION APPARATUS AND
COMMUNICATION METHOD

TECHNICAL FIELD

The present invention relates to a communication apparatus such as a base station apparatus in a mobile communication system, and more particularly, to a communication apparatus equipped with an array antenna.

BACKGROUND ART

An example of a communication apparatus and communication method equipped with an array antenna is described in the Unexamined Japanese Patent Publication No. HEI 10-336149.

An array antenna is configured by a plurality of antenna elements and allows transmission directivity to be freely set by adjusting the amplitude and phase of a signal transmitted from each antenna element.

FIG. 1 is block diagram showing a configuration of the transmitting side of a base station apparatus equipped with a conventional array antenna.

Base station apparatus 1 has a configuration equipped with an array antenna made up of two antennas 2 and 3, radio apparatuses 4 and 5 with antennas 2 and 3 connected thereto, switch 6, measuring apparatus 7 and baseband signal processing apparatus 8. Baseband signal processing apparatus 8 has a configuration equipped with baseband signal generator 9, phase/amplitude correction sections 10 and 11 and error storage section 12. Radio apparatuses 4 and 5 have a configuration equipped with quadrature modulation sections 13 and 14, transmit power amplifiers 15 and 16 and switches 17 and 18, respectively.

However, base station apparatus 1 is normally equipped with a plurality of baseband signal processing apparatuses to generate transmission signals to a plurality of mobile station apparatuses, which are not shown and FIG.1 shows a case where only one baseband signal processing apparatus 8 is provided for simplicity. Furthermore, means for receiving and demodulating a signal transmitted from the mobile station apparatus is omitted.

Operation of base station apparatus 1 in the above configuration when communicating with the mobile station apparatus will be explained below.

First, baseband signal generator 9 generates two baseband signals made up of an in-phase component (hereinafter referred to as "Ich") and a quadrature component (hereinafter referred to as "Qch") and outputs these components to radio apparatuses 4 and 5 via phase/amplitude correction sections 10 and 11. Baseband signal generator 9 also outputs a gain control signal to transmit power amplifiers 15 and 16 via phase/amplitude correction sections 10 and 11.

Here, the two baseband signals output to two radio apparatuses 4 and 5 are generated in baseband signal generator 9 by multiplying a same baseband signal by individual complex coefficients.

The baseband signals input to radio apparatuses 4 and 5 are subjected to quadrature modulation by quadrature modulation sections 13 and 14, up-converted to a radio frequency band, amplified by transmit power amplifiers 15 and 16 with an amplification gain controlled according to a gain control signal and become transmission signals.

These transmission signals are emitted from antennas 2 and 3 via switches 17 and 18 set so as to connect antenna 2 and transmit power amplifier 15 and connect antenna 3 and transmit power amplifier 16.

Here, by adjusting complex coefficients multiplied in baseband signal generator 9, it is possible to increase radiation field intensity only in a desired direction. This is called "providing transmission directivity". Providing transmission directivity makes it possible to keep reception (SIR Signal to Interference Ratio) of other communication instruments high.

However, the characteristics of transmit power amplifiers 15 and 16 vary individually depending on variations of component analog elements. Since different unknown amplitude variations and phase rotations are added to the transmission signals of antennas 2 and 3, the transmission directivity formed in this way is different from the transmission directivity that is expected to be obtained by being multiplied by complex coefficients in baseband signal generator 9.

To prevent such a phenomenon, it is necessary to adjust transmit power amplifiers 15 and 16 so as to have identical characteristics. However, it is extremely difficult to accurately and time-invariably adjust the characteristics of analog elements such as amplifiers 15 and 16.

Thus, instead of adjusting the characteristics of transmit power amplifiers 15 and 16, a method of measuring and storing the characteristics of transmit power amplifiers 15 and 16 beforehand and correcting baseband signals during a communication anticipating that the amplitude and phase of transmission signals will change by the errors in the characteristics.

The characteristics of transmit power amplifiers 15 and 16 are measured beforehand before starting a communication. In this case, switch 17 is set so that transmit power amplifier 15 is connected with switch 6 and switch 18 is set so that transmit power amplifier 16 is connected with switch 6 first. Furthermore, switch 6 is set so that either switch 17 or 18 is connected with measuring apparatus 7. Here, switch 6 is set so that switch 17 is connected with measuring apparatus 7 first.

Then, in order to measure the characteristics of transmit power amplifiers 15 and 16, baseband signals with a known information symbol (in this case, especially referred to as "calibration signals") are generated from baseband signal generator 9 and output to radio apparatuses 4 and 5.

The baseband signals input to radio apparatuses 4 and 5 are amplified by transmit power amplifiers 15 and 16 via quadrature modulation sections 13 and 14, and then output to measuring apparatus 7 via switches 17 and 6.

Then, measuring apparatus 7 measures the amplitude and phase of the input signal, calculates errors between these measured values and predetermined expected values of the amplitude and phase and these errors are stored in error storage section 12.

Hereinafter, switch 6 is switched so that switch 17 is connected with measuring apparatus 7 and the same processing above is carried out.

After this processing is completed, switches 17 and 18 are switched to the antennas 2 and 3 sides to start a communication. During this communication, phase/amplitude correction sections 10 and 11 correct baseband signals and gain control signals input from baseband signal generator 9 according to the errors stored in error storage section 12.

This correction is carried out by multiplying the baseband signals and gain control signals by complex coefficients that cancel out the characteristic errors of transmit power amplifiers 15 and 16. At this time, the complex coefficients multiplied on the baseband signals correct the phase of the transmission signals output from transmit power amplifiers 15 and 16 and the complex coefficients multiplied on the gain control signals correct the amplitude of the transmission signals.

Then, a configuration of the receiving side of the base station apparatus equipped with the conventional array antenna will be explained using the block diagram in FIG. 2.

Base station apparatus 51 shown in FIG. 2 is equipped with an array antenna made up of two antennas 52 and 53 and has a configuration equipped with radio apparatuses 54 and 55 with antennas 52 and 53 connected thereto, calibration signal generator 56 and baseband signal processing apparatus 57.

Radio apparatuses 54 and 55 have a configuration equipped with switches 58 and 59, AGC (Automatic Gain Control) amplifiers 60 and 61 and quadrature demodulation sections 62 and 63, respectively. Baseband signal processing apparatus 57 has a configuration equipped with phase/amplitude correction sections 64 and 65, baseband signal processing section 66 and error detection/storage section 67.

The following is an explanation of operation of base station apparatus 51 when receiving a signal from a mobile station apparatus.

However, when a signal sent from the mobile station apparatus is received, switch 58 is set so as to connect antenna 52 and AGC amplifier 60 and switch 59 is set so as to connect antenna 53 and AGC amplifier 61.

First, a signal received from antenna 52 is output to AGC amplifier 60 via switch 58 and AGC amplifier 60 performs auto-gain control so that the amplitude becomes constant.

In this case, an AGC signal indicating the auto-gain control result is output to baseband signal processing section 66 via phase/amplitude correction section 64 and the signal subjected to auto-gain control output from AGC amplifier 60 is demodulated by quadrature demodulation section 62 and becomes a baseband signal made up of an Ich and Qch. After the amplitude and phase of this baseband signal are corrected by phase/amplitude correction section 64, the baseband signal is output to baseband signal processing section 66. Furthermore, phase/amplitude correction section 64 also corrects the amplitude and phase of the AGC signal.

Baseband signal processing section 66 performs processing on the baseband signal and AGC signal such as conversion to a predetermined frequency. The same reception processing above is also performed on the system on the reception apparatus 55 side.

When such reception processing is carried out, as explained on the transmitting side above, radio apparatuses 54 and 55 have characteristic variations because AGC amplifiers 60 and 61 that make up radio apparatuses 54 and 55 are analog elements, and it is extremely difficult to adjust these variations accurately and time-invariably.

Thus, a method is adopted by which the characteristics of radio apparatuses 54 and 55 are measured and stored beforehand before starting reception processing and the baseband signal is corrected during reception anticipating that the baseband signal will change by the errors between these measured values and predetermined expected values of the amplitude and phase.

The method of measuring characteristics of radio apparatuses 54 and 55 will be described below.

Before carrying out this measurement, switch 58 is set so as to connect calibration signal generator 56 and AGC amplifier 60 and switch 59 is set so as to connect calibration signal generator 56 and AGC amplifier 61.

Then, in order to measure characteristics of radio apparatuses 54 and 55, a calibration signal with a known information symbol is generated from calibration signal generator 56 and this signal is output to baseband signal processing section 66 via radio apparatuses 54 and 55 and phase/amplitude correction sections 64 and 65 and further output to error detection/storage section 67.

Error detection/storage section 67 detects the amplitude and phase of the base band signal and AGC signal based on the calibration signal, finds errors between these detected values and the predetermined expected values of the amplitude and phase and stores these errors.

Then, switches 58 and 59 are switched to the antenna 52 and 53 sides to start reception. During reception, phase/amplitude correction sections 64 and 65 correct the baseband signals and AGC signals of their respective systems according to the errors stored in error detection/storage section 67.

This correction is performed by multiplying the baseband signals and AGC signals by complex coefficients according to the aforementioned errors that cancel out the characteristic errors of radio apparatuses 54 and 55.

However, the conventional apparatus has a problem that it is unable, during transmission, to carry out a measurement to find characteristic errors of transmit power amplifiers 15 and 16 necessary to correct amplitude and phase shifts of the transmission signal during a communication with the mobile station apparatus and the communication must be interrupted to carry out the measurement.

Likewise, the conventional apparatus has another problem that it is unable, during reception, to carry out a measurement to find characteristic errors of radio apparatuses 54 and 55 necessary to correct amplitude and phase shifts of the baseband signals and AGC signals during a communication with the mobile station apparatus and the communication must be interrupted to carry out the measurement.

Moreover, carrying out the measurement above requires provision of an oscillation circuit to generate a calibration signal with a known information symbol on the transmitting side, which involves a problem of increasing the size and cost of the apparatus accordingly. Likewise, it also requires provision of an oscillation circuit to generate a calibration signal on the receiving side, which involves a problem of increasing the size and cost of the apparatus accordingly.

DISCLOSURE OF INVENTION

It is a first object of the present invention to provide a communication apparatus and communication method capable of correcting amplitude and phase shifts of a transmission signal without interrupting communications with other apparatuses and at the same time reducing the size and cost of the apparatus.

This object can be attained by calculating the phase difference and amplitude difference between the input signal and output signal of the transmit power amplifier and correcting the baseband signals and gain control signals so that the phase difference is eliminated and the amplitude difference becomes equal to the expected value.

It is a second object of the present invention to provide a communication apparatus and communication method capable of correcting amplitude and phase shifts of the reception baseband signals and AGC signals without interrupting communications with other apparatuses and reducing the size and cost of the apparatus.

This object can be attained by calculating amplitude and phase errors between an AGC signal and baseband signal based on a signal received by each antenna and a reference AGC signal and baseband signal and correcting the amplitude and phase of the auto-gain control signal and demodulated signal so that these errors are eliminated.

BEST MODE FOR CARRYING OUT THE INVENTION

With reference now to the attached drawings, embodiments of the present invention will be explained below.
(Embodiment 1)

Figure 1:
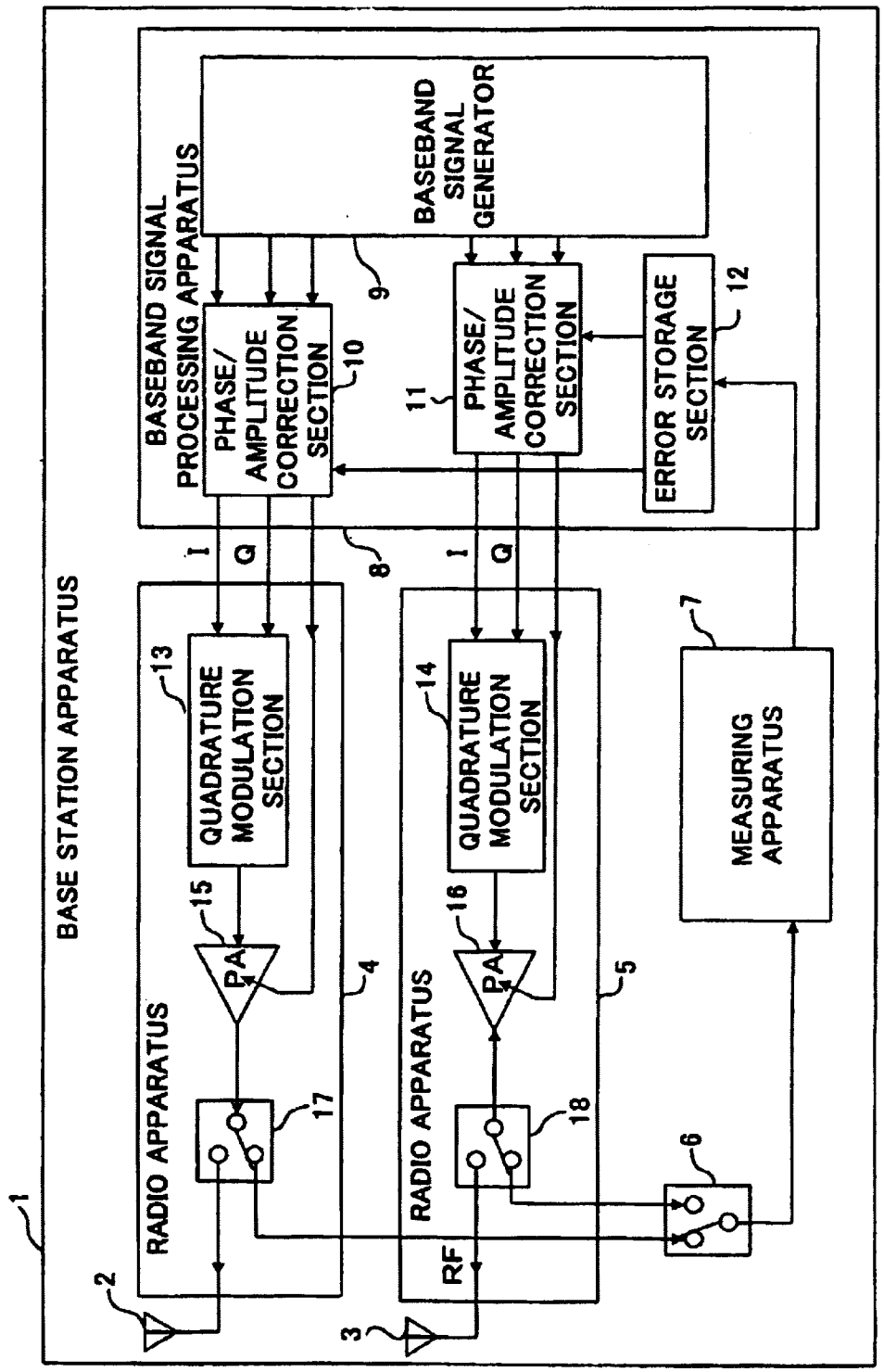
FIG. 1 is a block diagram showing a configuration on the transmitting side of a conventional base station apparatus.
Figure 2:
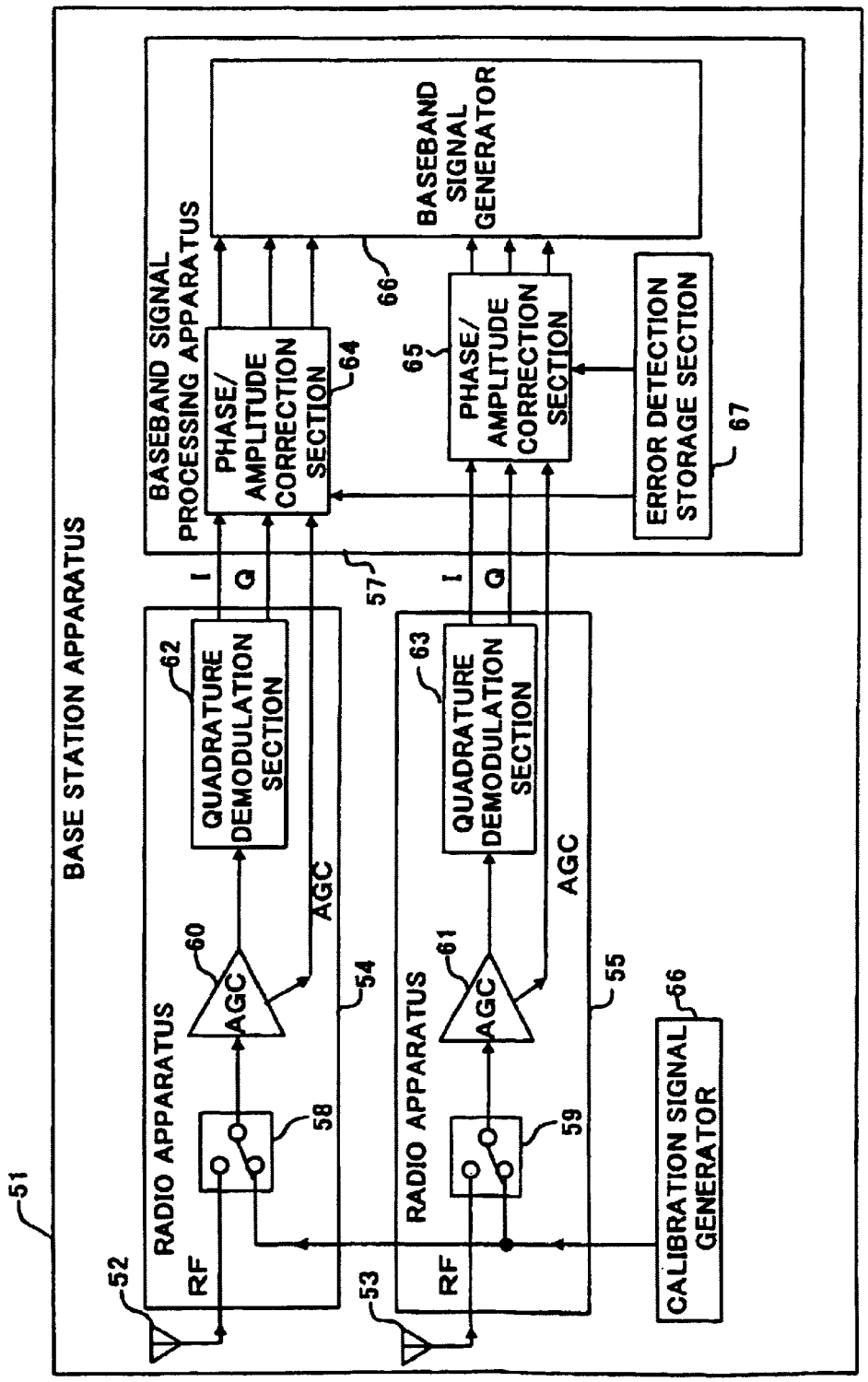
FIG. 2 is a block diagram showing a configuration on the receiving side of the conventional base station apparatus.
Figure 3:
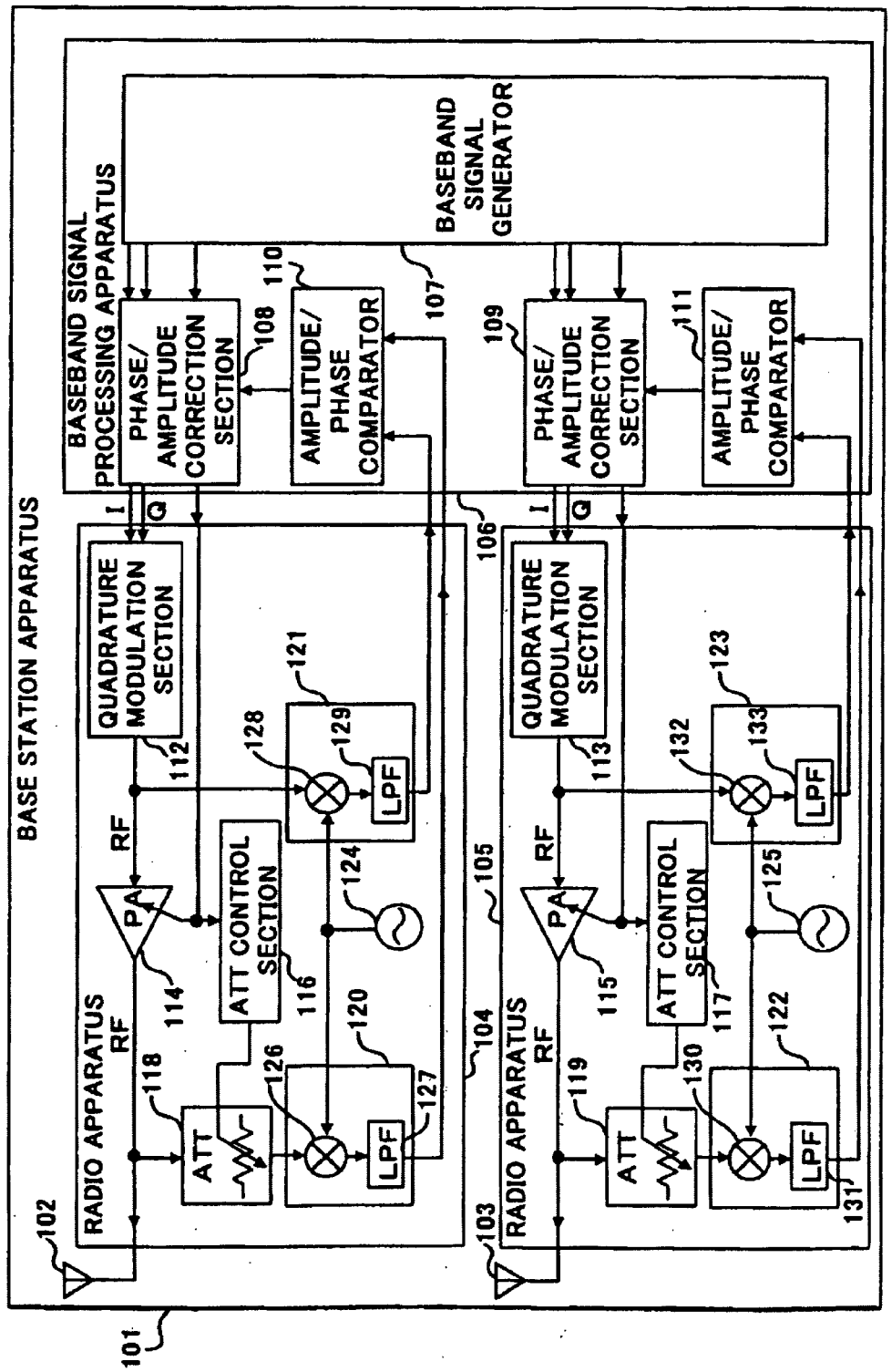
FIG. 3 is a block diagram showing a configuration on the transmitting side of a base station apparatus according to Embodiment 1 of the present invention.

FIG. 3 is a block diagram showing a configuration on the transmitting side of a base station apparatus according to Embodiment 1 of the present invention.

Base station apparatus 101 shown in FIG. 3 has a configuration equipped with an array antenna made up of two antennas 102 and 103, radio apparatuses 104 and 105 with antennas 102 and 103 connected thereto and baseband signal processing apparatus 106.

On the other hand, baseband signal processing apparatus 106 has a configuration equipped with baseband signal generator 107, phase/amplitude correction sections 108 and 109 in a digital circuit configuration equipped with a D/A conversion circuit, which is not shown, at the signal output to radio apparatuses 104 and 105, and amplitude/phase comparators 110 and 111 in a digital circuit configuration equipped with an A/D conversion circuit, which is not shown, at the signal input from radio apparatuses 104 and 105.

Radio apparatuses 104 and 105 have a configuration equipped with quadrature modulation sections 112 and 113, transmit power amplifiers 114 and 115, ATT (attenuator) control sections 116 and 117, ATT 118 and 119, two frequency conversion sections 120 and 121, 122 and 123 and oscillation sections (local oscillators) 124 and 125, respectively.

Frequency conversion section 120 is equipped with mixer 126 and LPF (Low Pass Filter) 127 and other frequency conversion sections 121 to 123 also have a same configuration equipped with mixer 128 and LPF 129, mixer 130 and LPF 131 and mixer 132 and LPF 133.

Base station apparatus 101 is normally equipped with a plurality of baseband signal processing apparatuses to generate signals to be transmitted to a plurality of mobile station apparatuses, which are not shown. However, for simplicity, FIG. 3 shows a case where only one baseband signal processing apparatus 106 is provided. The means for receiving and demodulating a signal sent from a mobile station apparatus is also omitted.

When base station apparatus 101 in the above configuration carries out a communication with a mobile station apparatus, baseband signal generator 107 generates two baseband signals made up of an Ich and Qch first and outputs these baseband signals through phase/amplitude correction sections 108 and 109 to quadrature modulation sections 112 and 113 of radio apparatuses 104 and 105. Furthermore, baseband signal generator 107 also outputs gain control signals through phase/amplitude correction sections 108 and 109 to transmit power amplifiers 114 and 115.

Here, baseband signal generator 107 generates two baseband signals to be output to two radio apparatuses 104 and 105 by multiplying a same baseband signal by individual complex coefficients. Furthermore, baseband signal generator 107 can provide transmission directivity by adjusting the complex coefficients.

Quadrature modulation sections 112 and 113 perform quadrature modulation on the baseband signals input to radio apparatuses 104 and 105 and then up-convert the baseband signals to a radio frequency band. Transmit power amplifiers 114 and 115 amplify the output signals of quadrature modulations sections 112 and 113 according to a gain control signal and emit the respective signals from antennas 102 and 103. However, there is also a case where a duplexer, which is not shown, is used to serve as a transmission antenna element and reception antenna element at the same time.

After transmit power amplifier 114, frequency conversion section 120 is connected thereto via ATT 118 and before transmit power amplifier 114, frequency conversion section 121 is connected thereto. ATT 118 is inserted to prevent excessive signal powers output from transmit power amplifier 114 from destroying frequency conversion section 120. The amount of attenuation of ATT 118 is controlled according to a gain control signal supplied from baseband signal processing apparatus 106 via phase/amplitude correction section 108.

Mixers 126 and 128 of frequency conversion sections 120 and 121 are supplied with a common oscillation signal output from oscillation section 124. Mixer 128 in the post-stage mixes a quadrature-modulated signal with a radio frequency (RF) output from quadrature modulation section 112 with an oscillation signal and performs down-conversion, while mixer 126 in the pre-stage mixes the transmission signal with the radio frequency output from transmit power amplifier 114 with the oscillation signal and performs down-conversion, and the two down-converted signals are output to amplitude/phase comparator 110.

Amplitude/phase comparator 110 finds amplitude and phase errors between both signals by comparison. In the calculation to find the errors, the set amplification factor of transmit power amplifier 114 and the attenuation factor of ATT 118 are canceled out each other.

The amplitude and phase errors found in this way reflect the amplitude and phase variations produced when signals pass through transmit power amplifier 114, and therefore these errors are supplied to phase/amplitude correction section 108 as the errors to cancel out those variations and used to correct the transmission signal.

In phase/amplitude correction section 108, a baseband signal and gain control signal input from baseband signal generator 107 are corrected according to the errors.

This correction is performed by multiplying the baseband signal and gain control signal by complex coefficients that cancel out the characteristic errors of transmit power amplifier 114 and at this time, the complex coefficient to be multiplied on the baseband signal corrects the phase of the transmission signal output from transmit power amplifier 114 and the complex coefficient to be multiplied on the gain control signal corrects the amplitude of the transmission signal. Furthermore, correction similar to this is also performed on the other system equipped with radio apparatus 105.

Such correction processing can be performed without interrupting communications and can be performed either intermittently or continuously.

On the other hand, when ATT control section 116 and ATT 118 are not connected, it is also possible to allow amplitude/phase comparator 110 to calculate the phase difference and amplitude difference between the input signal and output signal of transmit power amplifier 114 and allow phase/amplitude correction section 108 to correct the baseband signal and gain control signal output from baseband signal generator 107 to transmit power amplifier 114 so that the phase difference is eliminated and the amplitude difference matches the expected value. The same also applies to the other system.

Thus, by calculating the phase difference and amplitude difference between the input signal and output signal of the transmit power amplifier and correcting a baseband signal and gain control signal so that the phase difference is eliminated and the amplitude difference matches an expected value, it is possible to correct amplitude and phase shifts of the transmission signal output from the transmit power amplifier during a communication with the mobile station apparatus. Furthermore, since there is no need for providing an oscillation circuit to generate a calibration signal with a known information symbol necessary for correction as in the case of the prior art, the present invention can reduce the size and cost of the apparatus accordingly.

Furthermore, by calculating the phase difference and amplitude difference between the output signal of the transmit power amplifier attenuated according to the gain control signal and input signal of the transmit power amplifier and correcting the baseband signal and gain control signal so that the phase difference and amplitude difference are eliminated, it is possible to allow the amplitude of the transmission signal output from the transmit power amplifier to match the amplitude of the input signal of transmit power amplifier 114.

Furthermore, by down-converting the attenuated output signal of the transmit power amplifier and the input signal of the transmit power amplifier to a same low frequency, it is possible to implement conversion to a digital value with a simple circuit, and by doing so it is possible to implement a processing configuration to make a comparison in order to calculate amplitude and phase errors with a simple circuit.

(Embodiment 2)

Embodiment 2 describes a case where up-conversion up to an intermediate frequency (IF) band is carried out first and then up-conversion up to a radio frequency (RF) band is carried out.

Figure 4:
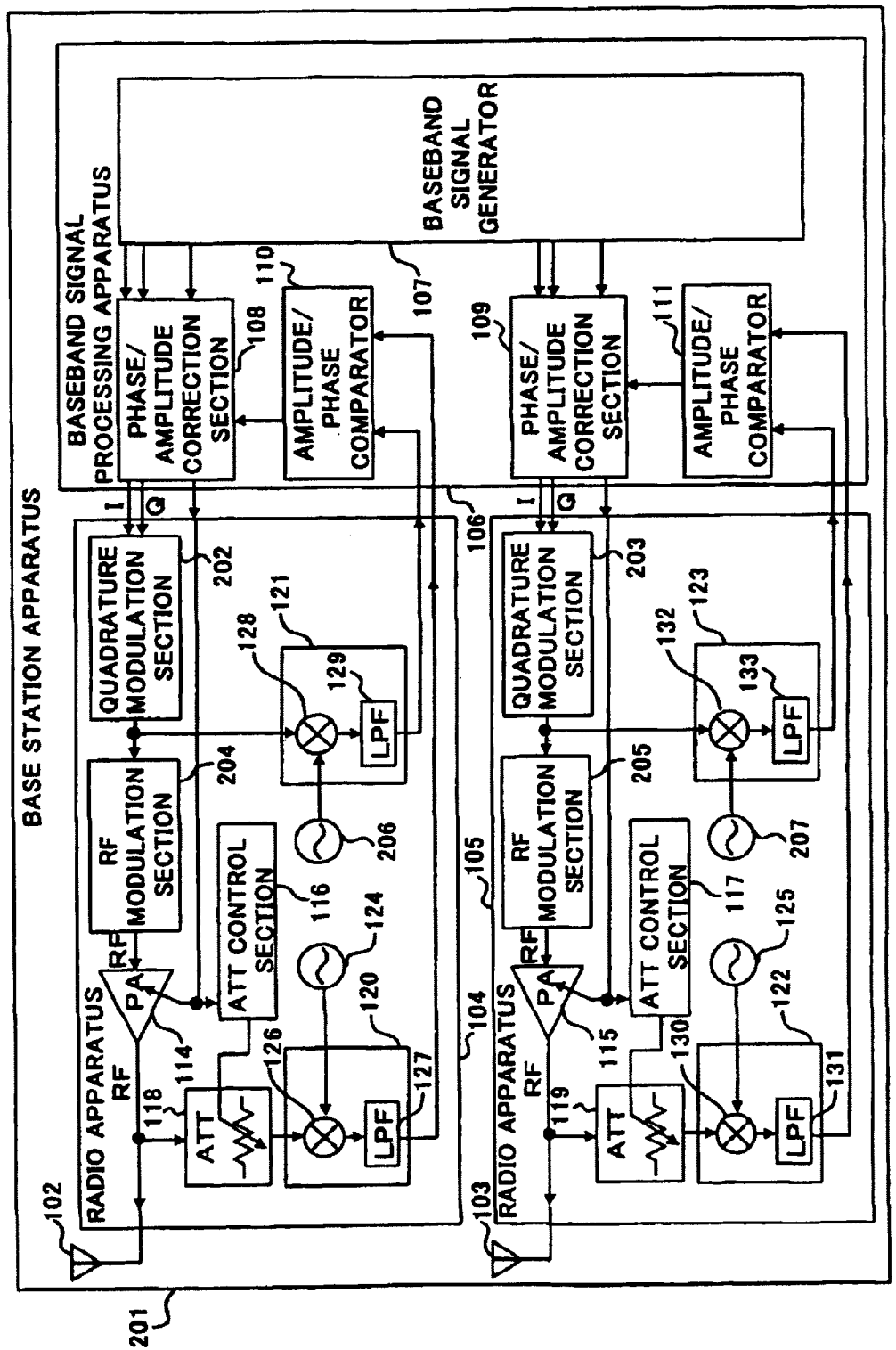
FIG. 4 is a block diagram showing a configuration on the transmitting side of a base station apparatus according to Embodiment 2 of the present invention.

FIG. 4 is a block diagram showing a configuration on the transmitting side of a base station apparatus according to Embodiment 2 of the present invention. However, the components of base station apparatus 201 in FIG. 4 common to those of base station apparatus 101 in FIG. 3 are assigned the same reference numerals and explanations thereof will be omitted.

When compared to base station apparatus 101 in FIG. 3, base station apparatus 201 in FIG. 4 adopts a configuration equipped with quadrature modulation sections 202 and 203 instead of quadrature modulation sections 112 and 113. Furthermore, base station apparatus 201 in FIG. 4 also adopts a configuration with RF modulation sections 204 and 205 and oscillation sections 206 and 207 added to base station apparatus 101 in FIG. 3.

Quadrature modulation sections 202 and 203 do not directly carry out up-conversion up to a radio frequency (RF) band, but carry out up-conversion up to an intermediate frequency (IF) band first.

RF modulation sections 204 and 205 are provided between quadrature modulation sections 202 and 203, and transmit power amplifiers 114 and 115 and convert an IF signal to an RF signal.

Oscillation sections 206 and 207 oscillate a frequency signal to make the signal frequencies obtained by down-converting the IF signal using frequency conversion sections 121 and 123 identical to the output frequencies of frequency conversion sections 120 and 122 that down-convert the RF signal.

Of the two systems of base station apparatus 201 in the above configuration, only one system will be explained below. The RF signal input to RF modulation section 204 and the RF signal output from transmit power amplifier 114 are down-converted to a same frequency by frequency conversion sections 120 and 121, respectively and both converted signals are output to amplitude/phase comparator 110.

Amplitude/phase comparator 110 finds amplitude and phase errors between the two signals by comparison. Since these amplitude and phase errors obtained reflect the amplitude and phase variations produced when signals pass through RF modulation section 204 and transmit power amplifier 114, these are the errors that should cancel out those variations. Then, phase/amplitude correction section 108 corrects the baseband signal and gain control signal input from baseband signal generator 107 according to the errors obtained by amplitude/phase comparator 110.

As shown above, when up-conversion up to an intermediate frequency (IF) band is carried out first and then up-conversion up to a radio frequency (RF) band is carried out, it is possible to correct amplitude and phase errors originated from the area of RF modulation sections 204 and 205 plus transmit power amplifiers 114 and 115 by down-converting the two signals with different frequencies to a same frequency using frequency conversion sections 120 and 121.

(Embodiment 3)

Embodiment 3 describes a case where quadrature modulations 302 and 303 are configured by analog elements.

Figure 5:
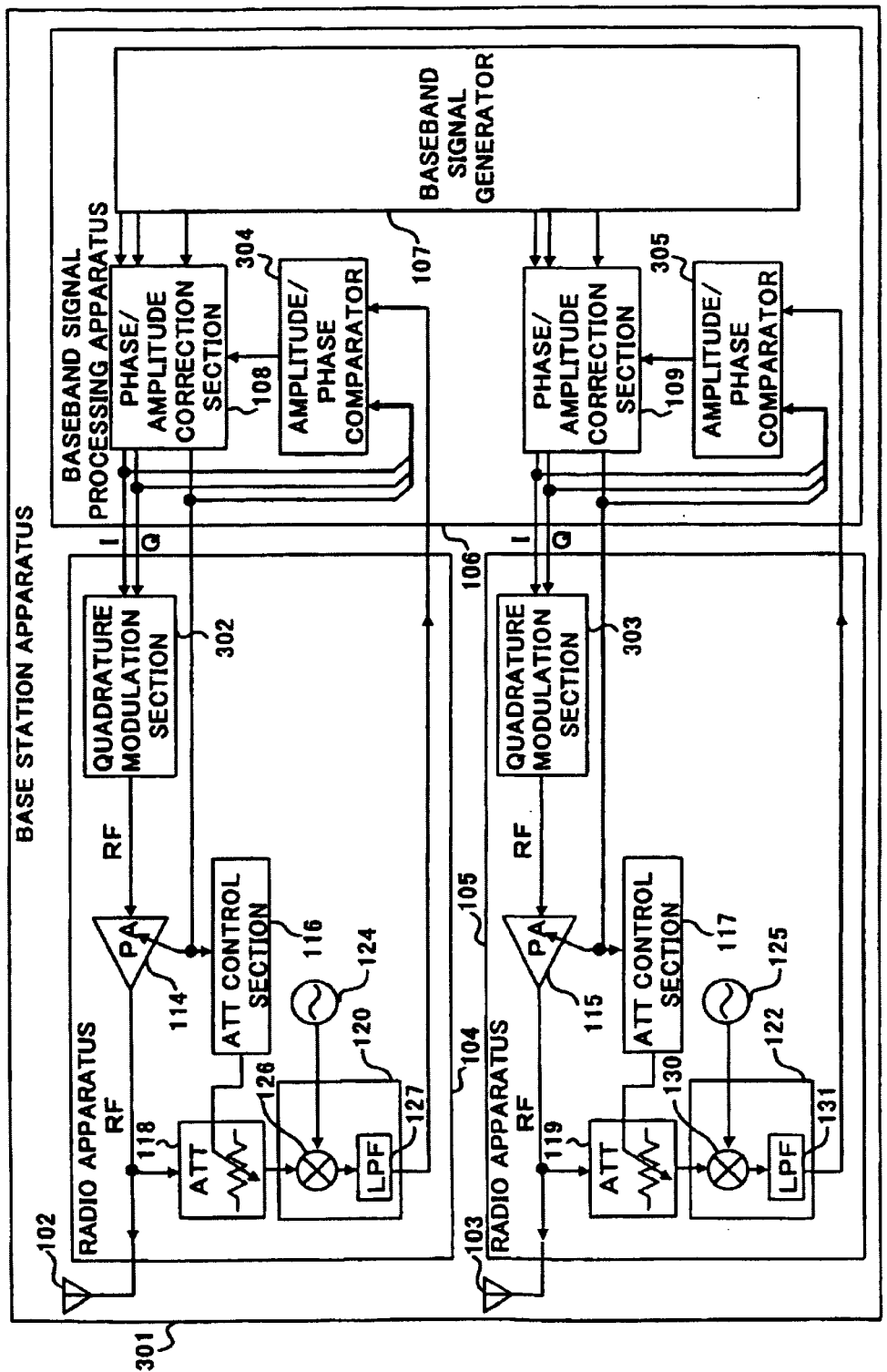
FIG. 5 is a block diagram showing a configuration on the transmitting side of a base station apparatus according to Embodiment 3 of the present invention.

FIG. 5 is a block diagram showing a configuration on the transmitting side of a base station apparatus according to Embodiment 3 of the present invention. However, the components of base station apparatus 301 in FIG. 5 common to those of base station apparatus 101 in FIG. 3 are assigned the same reference numerals and explanations thereof will be omitted.

When compared to base station apparatus 101 in FIG. 3, base station apparatus 301 in FIG. 5 adopts a configuration equipped with quadrature modulation sections 302 and 303 configured by analog elements instead of quadrature modulation sections 112 and 113. Furthermore, base station apparatus 301 in FIG. 5 adopts a configuration with frequency conversion sections 121 and 123 removed and amplitude/phase comparators 304 and 305 added instead of amplitude/phase comparators 110 and 111 to base station apparatus 101 in FIG. 3.

Amplitude/phase comparators 304 and 305 compare the amplitude and phase between the input signals of quadrature conversion sections 302 and 303 and the output signals of frequency conversion sections 120 and 122.

Of the two systems of the base station apparatus 301 in the above configuration, only one system will be explained below. The input signal of quadrature modulation section 302 and the signal output from transmit power amplifier 114 via ATT 118 and frequency conversion section 120 are output to amplitude/phase comparator 304.

Amplitude/phase comparator 304 finds amplitude and phase errors between the two signals by comparison. Since these amplitude and phase errors obtained reflect the amplitude and phase variations produced when signals pass through transmit power amplifier 114 from quadrature modulation section 302, these are the errors that should cancel out those variations. Then, phase/amplitude correction section 108 corrects the baseband signal and gain control signal input from baseband signal generator 107 according to the errors output from amplitude/phase comparator 304.

In FIG. 5, the input signals of quadrature modulation sections 302 and 303 are led to amplitude/phase comparators 304 and 305 inside baseband signal processing apparatus 106, but it is also possible to configure so that the input signals are led from with radio apparatus 104.

As shown above, when quadrature modulation sections 302 and 303 are configured by analog elements, it is possible to correct amplitude and phase errors originated from the components from quadrature modulation section 302 to transmit power amplifier 114 by calculating the amplitude and phase differences between the signal output from transmit power amplifier 114 and input signal of quadrature modulation section 302 and correcting the baseband signal and gain control signal in such a way as to eliminate the amplitude and phase differences.

(Embodiment 4)

Figure 6:
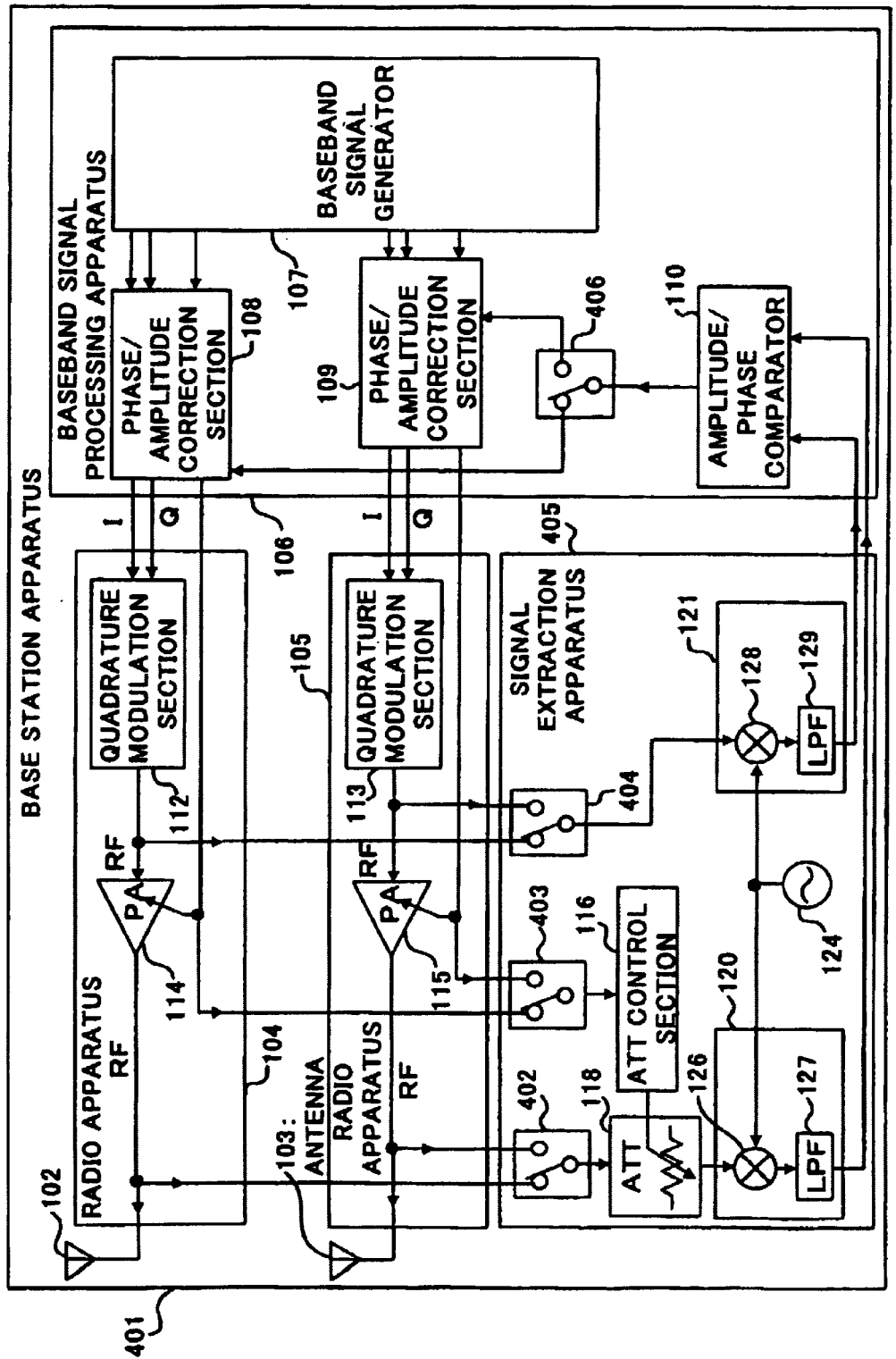
FIG. 6 is a block diagram showing a configuration on the transmitting side of a base station apparatus according to Embodiment 4 of the present invention.

FIG. 6 is a block diagram showing a configuration on the transmitting side of a base station apparatus according to Embodiment 4 of the present invention. However, the components of base station apparatus 401 in FIG. 6 common to those of base station apparatus 101 in FIG. 3 are assigned the same reference numerals and explanations thereof will be omitted.

Base station apparatus 401 shown in FIG. 6 has a configuration equipped with signal extraction apparatus 405 including ATT control section 116, ATT 118, frequency conversion sections 120 and 121 and oscillation section 124, which are provided for radio apparatuses 104 and 105 in base station apparatus 101 in FIG. 3, and in addition switches 402, 403 and 404 for switching the connection with either radio apparatus 104 or 105. Furthermore, switch 406 is connected between amplitude/phase comparator 110 and phase/amplitude correction section 108 or 109.

In base station apparatus 401 in the above configuration, it is possible to find and correct amplitude and phase errors as in the case of Embodiment 1 by switching switches 402 to 404 and 406 so that signal extraction apparatus 405 and amplitude/phase comparator 110 are connected to the route of radio apparatus 104. Moreover, it is also possible to find and correct amplitude and phase errors as in the case of Embodiment 1 by switching switches 402 to 404 and 406 so that signal extraction apparatus 405 and amplitude/phase comparator 110 are connected to the route of radio apparatus 105.

Furthermore, it is not necessary to provide components necessary to calculate amplitude and phase errors for each of radio apparatuses 104 and 105, and therefore it is possible to reduce the size of the entire apparatus compared to the configuration of Embodiment 1 and reduce the number of man-hours required to match the characteristics of the components above.

Moreover, in the case where radio apparatuses 104 and 105 are equipped with RF modulation sections 204 and 205 as shown in FIG. 4, it is possible to perform correction similar to that in Embodiment 2 by connecting switch 404 to the input side of RF modulation sections 204 and 205.

Furthermore, by configuring signal extraction apparatus 405 with ATT control section 116, ATT 118, frequency conversion section 120 and oscillation section 124 corresponding to the components of radio apparatus 104 shown in FIG. 5 and in addition switches 402 and 403, and by connecting these components through switches 402 and 403 to radio apparatuses 104 and 105 as in the case of FIG. 6 and further connecting amplitude/phase comparator 304 connected to the output side of phase/amplitude correction sections 108 and 109 to phase/amplitude correction sections 108 and 109 via switch 406, it is possible to perform correction similar to that of Embodiment 3.

(Embodiment 5)

Figure 7:
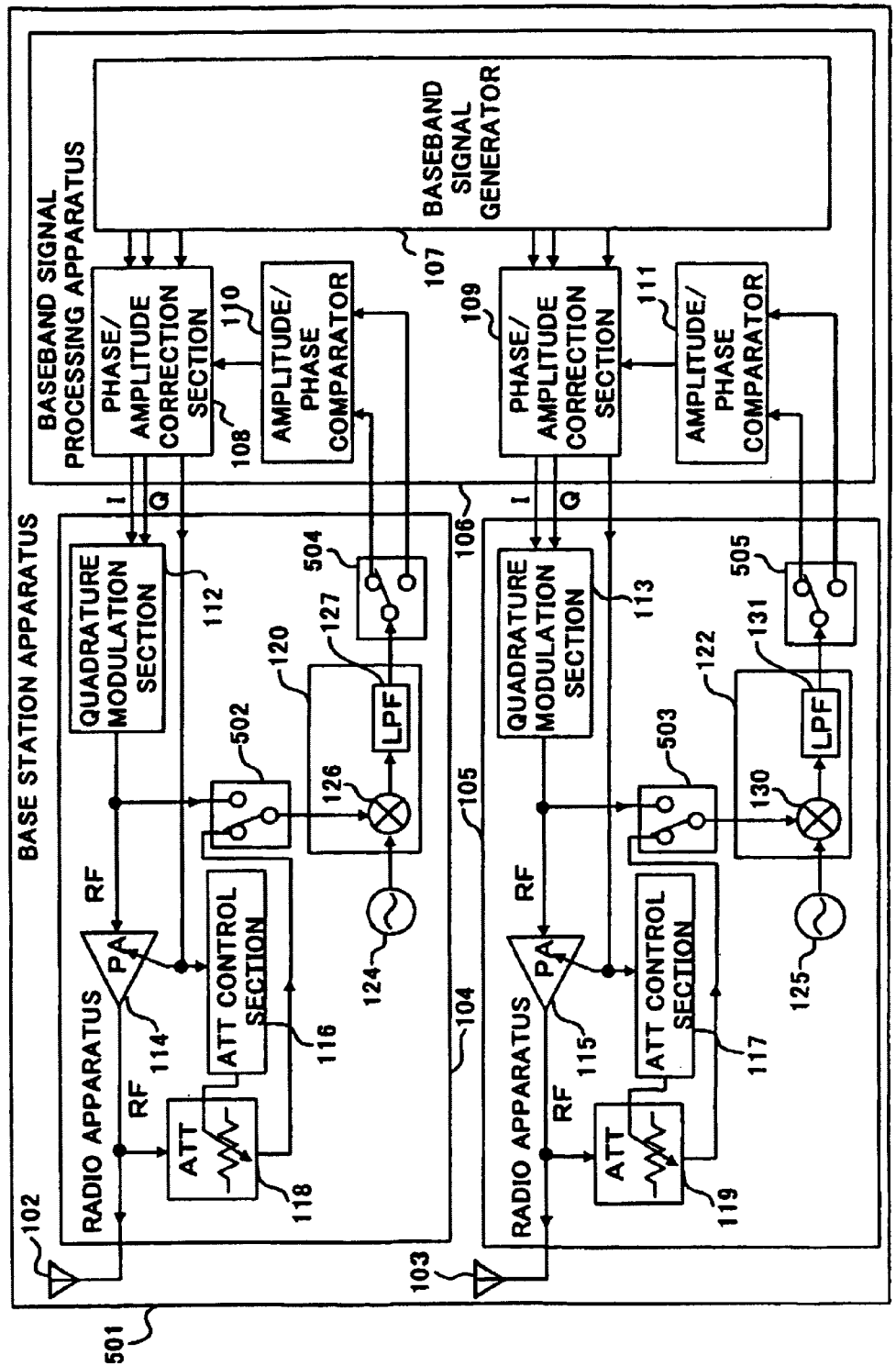
FIG. 7 is a block diagram showing a configuration on the transmitting side of a base station apparatus according to Embodiment 5 of the present invention.

FIG. 7 is a block diagram showing a configuration on the transmitting side of a base station apparatus according to Embodiment 5 of the present invention. However, the components of base station apparatus 501 in FIG. 7 common to those of base station apparatus 101 in FIG. 3 are assigned the same reference numerals and explanations thereof will be omitted.

Base station apparatus 501 shown in FIG. 7 has a configuration equipped with switches 502 and 503 instead of frequency conversion sections 121 and 123 provided for base station apparatus 101 in FIG. 3, and switches 504 and 505.

Switches 502 and 503 connect frequency conversion sections 120 and 122 to the input side of ATT 118 and 119 or transmit power amplifiers 114 and 115. Switches 504 and 505 connect frequency conversion sections 120 and 122 to either one of the input terminals of amplitude/phase comparators 109 and 110.

Operation of one route of base station apparatus 501 in the above configuration will be explained on behalf of the two routes. In radio apparatus 104, for example, switch 502 is connected to the output side of transmit power amplifier 114 via ATT 118 and switch 504 is connected to one of the input terminal sides of amplitude/phase comparator 110 first, and then switch 502 is connected to the input side of transmit power amplifier 114 and switch 504 is connected to the other input terminal side of amplitude/phase comparator 110. Hereinafter, the first and next connection operations are repeated alternately.

This allows amplitude and phase errors to be calculated and corrected as in the case of Embodiment 1.

Furthermore, this embodiment can reduce the number of components required to calculate amplitude and phase errors for each of radio apparatuses 104 and 105 more than Embodiment 1, and therefore can reduce the size of the entire apparatus and the number of man-hours to match the characteristics of the above components compared to Embodiment 1.

However, since this configuration does not allow simultaneous measurements on the output and input sides of transmit power amplifier 114, measurements should be conducted when the transmission signal has a certain degree of known cyclicity.

Furthermore, when radio apparatuses 104 and 105 are equipped with RF modulation sections 204 and 205 as shown in FIG. 4, it is possible to perform correction similar to that in Embodiment 2 by connecting switches 502 and 503 to the input side of RF modulation sections 204 and 205.

It is further possible to perform correction similar to that in Embodiment 3 by connecting switch 503 to the output side of phase/amplitude correction sections 108 and 109 as shown in FIG. 5.

(Embodiment 6)

Figure 8:
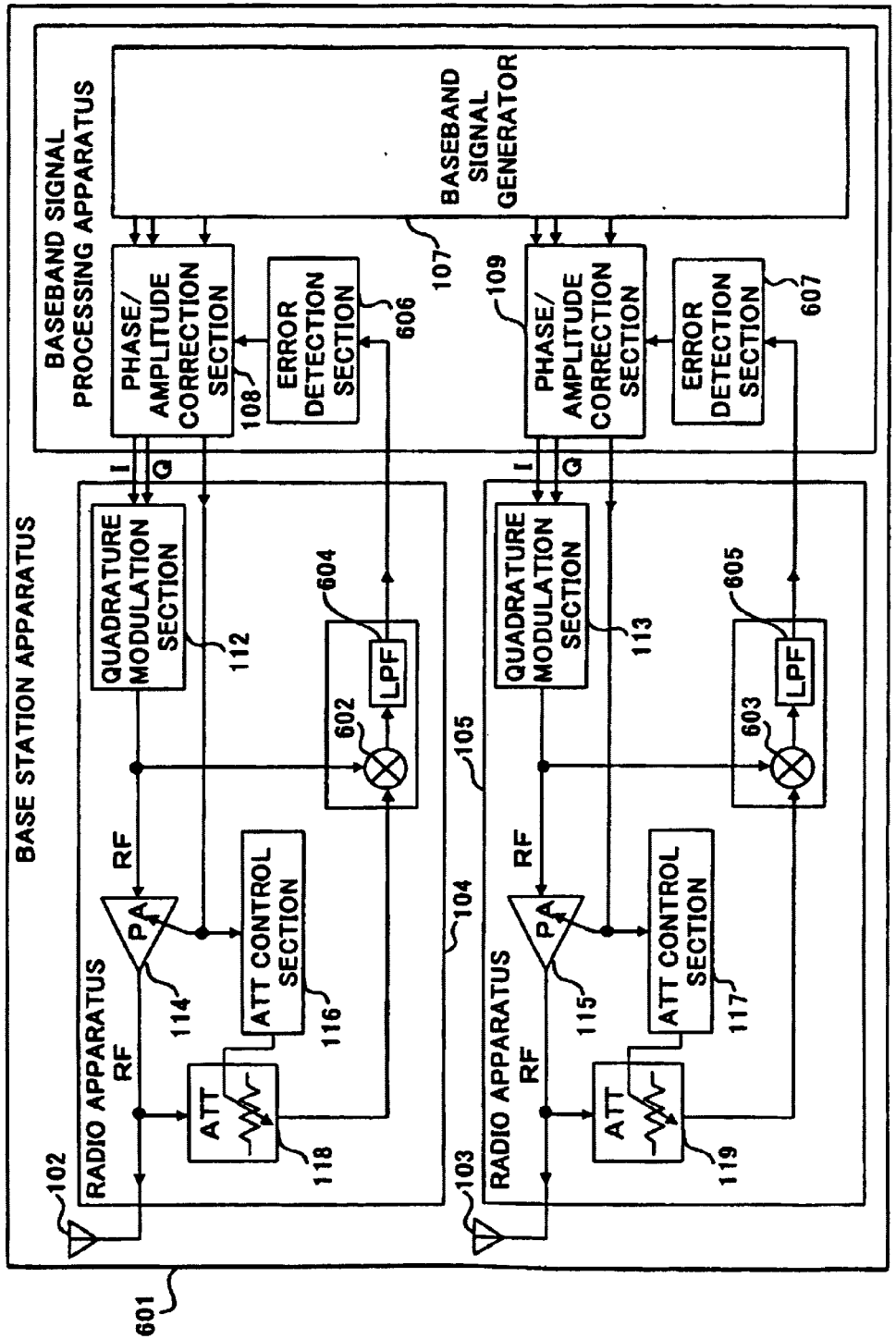
FIG. 8 is a block diagram showing a configuration on the transmitting side of a base station apparatus according to Embodiment 6 of the present invention.

FIG. 8 is a block diagram showing a configuration on the transmitting side of a base station apparatus according to Embodiment 6 of the present invention. However, the components of base station apparatus 601 in FIG. 8 common to those of base station apparatus 101 in FIG. 3 are assigned the same reference numerals and explanations thereof will be omitted.

Base station apparatus 601 shown in FIG. 8 has a configuration equipped with mixers 602 and 603, LPF 604 and 605 instead of frequency conversion sections 120 to 123 and oscillation sections 124 and 125 provided for base station apparatus 101 in FIG. 3. Base station apparatus 601 shown in FIG. 8 has a configuration equipped with baseband signal processing apparatus 106 further provided with error detection sections 606 and 607.

Mixers 602 and 603 mix the output signals of transmit power amplifiers 114 and 115 via ATT 118 and ATT 119 with the input signals of transmit power amplifiers 114 and 115, respectively. LPF 604 and 605 allow only low frequencies of the output signals of mixers 602 and 603 to pass. Error detection sections 606 and 607 detect amplitude and phase errors from the signals that have passed through LPF 604 and 605 and output to phase/amplitude corrections 108 and 109, respectively.

Operation of one route of base station apparatus 601 in the above configuration will be explained on behalf of the two routes.

When input and output signals of transmit power amplifier 114 have identical frequencies, the frequency of the signal mixed by mixer 602 becomes 0, and therefore "0" is output to error detection section 606 via LPF 604.

On the other hand, when input and output signals of transmit power amplifier 114 have different frequencies, the frequency of the mixed signal in mixer 602 becomes a frequency corresponding to the error and when the signal indicating this error is output to error detection section 606 via LPF 604, error detection section 606 detects amplitude and phase errors of the input/output signals of transmit power amplifier 114 and outputs to phase/amplitude correction section 108.

This allows amplitude and phase errors to be calculated and corrected as in the case of Embodiment 1.

Furthermore, this embodiment can reduce the number of components required to calculate amplitude and phase errors for each of radio apparatuses 104 and 105 more than Embodiment 1, and therefore can reduce the size of the entire apparatus and the number of man-hours to match the characteristics of the above components compared to Embodiment 1.

(Embodiment 7)

Figure 9:
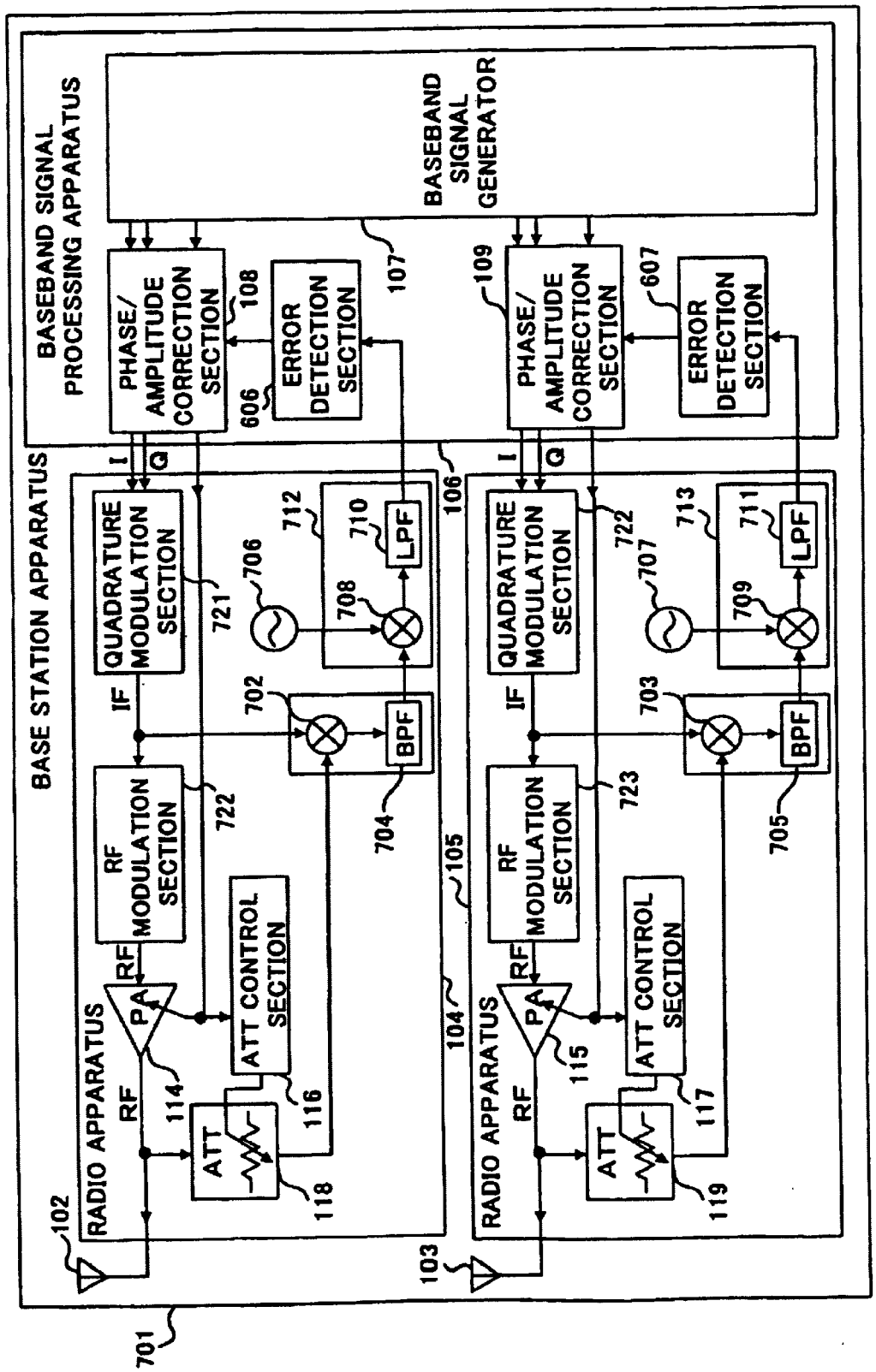
FIG. 9 is a block diagram showing a configuration on the transmitting side of a base station apparatus according to Embodiment 7 of the present invention.

FIG. 9 is a block diagram showing a configuration on the transmitting side of a base station apparatus according to Embodiment 7 of the present invention. However, the components of base station apparatus 701 in FIG. 9 common to those of base station apparatus 201 in FIG. 4 are assigned the same reference numerals and explanations thereof will be omitted.

Base station apparatus 701 shown in FIG. 9 has a configuration equipped with mixers 702 and 703, BPF (Band Pass Filter) 704 and 705, and oscillation sections 706 and 707, mixers 708 and 709 and LPF 710 and 711 instead of frequency conversion sections 120 to 123 and oscillation sections 124 and 125 provided for base station apparatus 201 in FIG. 4. Base station apparatus 601 shown in FIG. 9 also has a configuration equipped with baseband signal processing apparatus 106 provided with error detection sections 606 and 607. Base station apparatus 701 shown in FIG. 9 is further configured by baseband signal processing apparatus 106 equipped with error detection sections 606 and 607. However, error detection sections 606 and 607 are the same as those explained in Embodiment 6.

Mixers 702 and 703 mix the output signals of transmit power amplifiers 114 and 115 via ATT 118 and 119 with the input signals of RF modulation sections 722 and 723. BPF 704 and 705 allow only frequencies of a predetermined band of the output signals of mixers 702 and 703 to pass.

When the signals that have passed through BPF 704 and 705 have no amplitude and phase errors between the input sides of RF modulation sections 722 and 723 and the output sides of transmit power amplifiers 114 and 115, mixers 708 and 709 mix their frequencies with the oscillation frequencies from oscillation sections 706 and 707 and thereby cancel out the signal frequencies to 0.

Operation of one route of base station apparatus 701 in the above configuration will be explained on behalf of the two routes.

When the output signal of transmit power amplifier 114 via ATT 118 is mixed with the input signal of RF modulation section 204 by mixer 702 and this mixed signal has no amplitude and phase errors between the input side of RF modulation section 204 and output side of transmit power amplifier 114, the mixed frequency is canceled out to 0 by being mixed with an oscillation frequency from oscillation section 706 in mixer 708 via BPF 704. Then, the signal with frequency 0 is output to error detection section 606 via LPF 710.

On the other hand, when there are amplitude and phase errors between the input side of RF modulation section 204 and the output side of transmit power amplifier 114 the frequency of the signal mixed in mixer 708 reflects the errors and if the signal indicating these errors is output to error detection section 606, error detection section 606 detects amplitude and phase errors of the input/output signals of transmit power amplifier 114 and outputs to phase/amplitude correction section 108. In this way, phase/amplitude correction section 108 corrects amplitude and phase errors in the same way as explained in Embodiment 2.

This allows amplitude and phase errors to be calculated and corrected as in the case of Embodiment 2.

Furthermore, this embodiment can reduce the number of components required to calculate amplitude and phase errors for each of radio apparatuses 104 and 105 more than Embodiment 2, and therefore can reduce the size of the entire apparatus and the number of man-hours to match the characteristics of the above components accordingly compared to Embodiment 2.

(Embodiment 8)

Figure 10:
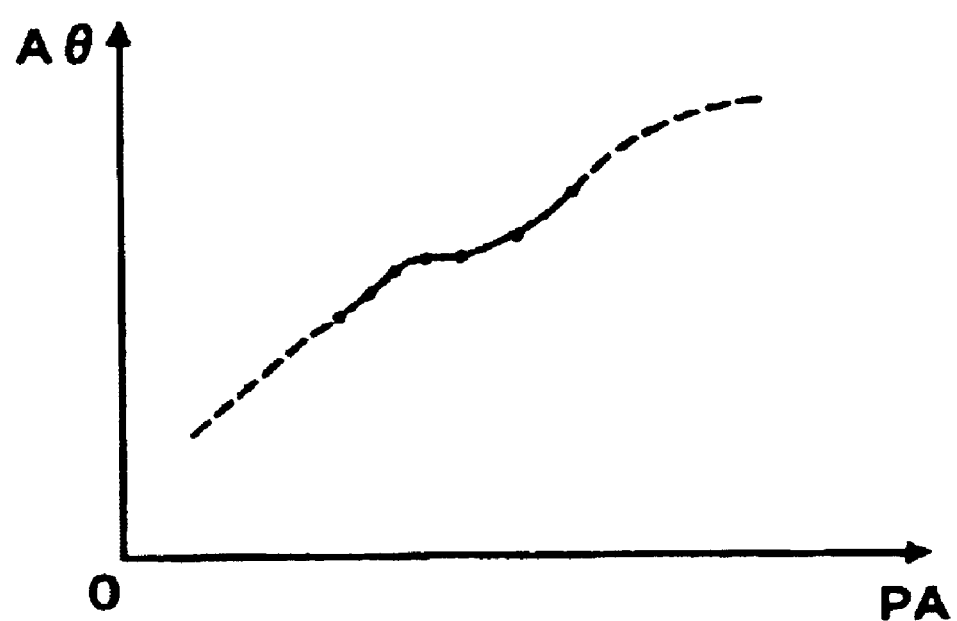
FIG. 10 illustrates a relationship between a control value and amplitude/phase characteristic of a transmit power amplifier of a base station apparatus according to Embodiment 8 of the present invention.

Here, as shown in FIG. 10, amplitude/phase characteristic Aè of a transmission signal varies depending on gain PA of a transmit power amplifier. Furthermore, gain PA of the transmit power amplifier may vary to a certain degree during communication.

On the contrary, phase/amplitude correction sections 108 and 109 in Embodiment 1 perform phase/amplitude corrections only based on the amplitude and phase errors calculated by amplitude/ phase comparators 110 and 111 without taking into consideration variations of amplitude/phase characteristic Aè of the transmission signal due to variations of transmit power.

This prevents accurate phase/amplitude corrections when transmit power changes during communication.

Moreover, in the case where amplitude/phase characteristic Aè with respect to gain PA of each transmit power amplifier is simply measured and a calibration table showing the relationship between gain PA of each transmit power amplifier and amplitude/phase characteristic Aè is created, communication must be stopped until this calibration table is completed.

To solve this problem, Embodiment 8 describes a case of improving the accuracy of phase/amplitude corrections by measuring amplitude/phase characteristics taking into consideration variations of amplitude/phase characteristic Aè of a transmission signal due to variations of transmit power without stopping communication.

Figure 11:
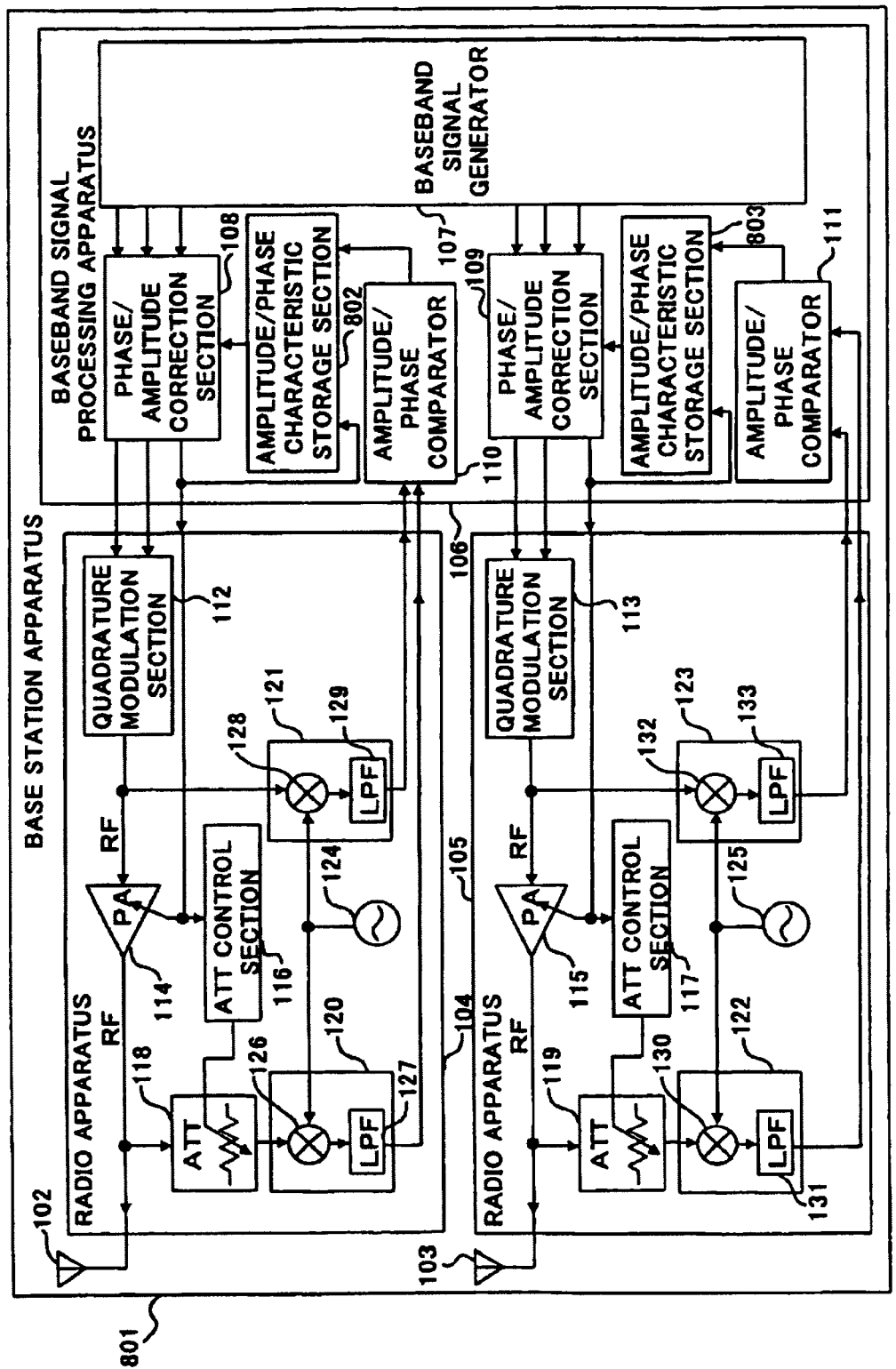
FIG. 11 is a block diagram showing a configuration on the transmitting side of the base station apparatus according to Embodiment 8 of the present invention.

FIG. 11 is a block diagram showing a configuration on the transmitting side of a base station apparatus according to Embodiment 8 of the present invention. However, the components of base station apparatus 801 in FIG. 11 common to those of base station apparatus 101 in FIG. 3 are assigned the same reference numerals as those in FIG. 3 and explanations thereof will be omitted.

Base station apparatus 801 shown in FIG. 11 adopts a configuration with amplitude/phase characteristic storage sections 802 and 803 added to base station apparatus 101 in FIG. 3.

Amplitude/phase characteristic storage section 802 stores amplitude/phase characteristic Aè of a transmission signal with respect to gain PA of transmit power amplifier 114 in a calibration table based on a gain control signal output from phase/amplitude correction section 108 and amplitude and phase errors output from amplitude/phase comparator 110 as described in FIG. 10 above.

Likewise, amplitude/phase characteristic storage section 803 stores amplitude/phase characteristic Aè of the transmission signal with respect to gain PA of transmit power amplifier 115 in the calibration table based on a gain control signal output from phase/amplitude correction section 109 and amplitude and phase errors output from amplitude/phase comparator 111 as described in FIG. 10 above.

Since gain PA of transmit power amplifiers 114 and 115 varies to a certain degree during communication, amplitude/phase characteristic storage sections 802 and 803 update the contents of the calibration table based on the measured gain PA at any time.

Phase/amplitude correction sections 108 and 109 each correct a gain control signal based on the content of the calibration table written in amplitude/phase characteristic storage sections 802 and 803, respectively. Gain PAs which were not measured in past communications are estimated based on the gain PAs measured so far.

In this way, by creating a calibration table showing the relationship of amplitude/phase characteristic Aè versus each gain PA and using it to correct the gain control signal, it is possible to carry out phase/amplitude corrections taking into consideration the amplitude/phase characteristic of the transmission signal without stopping communication.

(Embodiment 9)

Here, the power values of signals sent from antennas 102 and 103 are the products of the power values of the output signals of quadrature modulation sections 112 and 113 by the amplification values of transmit power amplifiers 114 and 115.

That is, even if the amplification values of transmit power amplifiers 114 and 115 are forcibly changed, linking these values with the power values of the output signals of quadrature modulators 112 and 113 makes it possible to keep the power values of the signals sent from antennas 102 and 103 constant.

Figure 12:
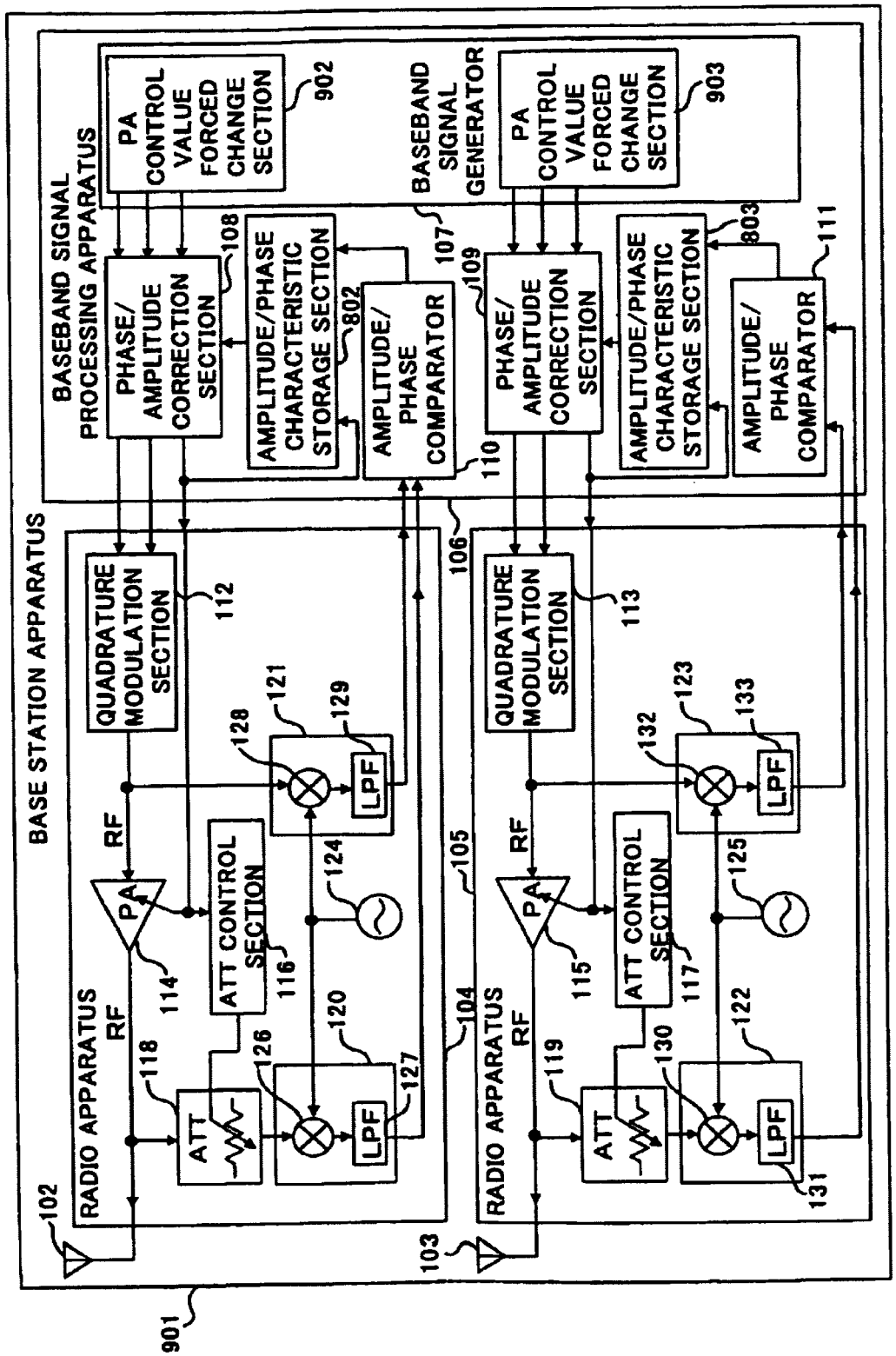
FIG. 12 is a block diagram showing a configuration on the transmitting side of a base station apparatus according to Embodiment 9 of the present invention.

FIG. 12 is a block diagram showing a configuration on the transmitting side of a base station apparatus according to Embodiment 9 of the present invention. However, the components of base station apparatus 901 in FIG. 12 common to those of base station apparatus 801 in FIG. 11 are assigned the same reference numerals as those in FIG. 11 and explanations thereof will be omitted.

Base station apparatus 901 shown in FIG. 12 adopts a configuration with PA control value forced change sections 902 and 903 added to base station apparatus 801 in FIG. 11.

PA control value forced change section 902 controls the power value of the output signal of baseband signal generator 107 and instructs phase/amplitude correction section 108 on the variation width to forcibly change gain PA of transmit power amplifier 114.

Likewise, PA control value forced change section 903 controls the power value of the output signal of baseband signal generator 107 and instructs phase/amplitude correction section 109 on the variation width to forcibly change gain PA of transmit power amplifier 115.

Phase/amplitude correction sections 108 and 109 output a gain control signal indicating a value obtained by multiplying corrected gain PA of transmit power amplifiers 114 and 115 by the variation widths instructed by PA control value forced change sections 902 and 903.

For example, in the case where PA control value forced change sections 902 and 903 instruct a variation width ½, the power value of the output signal of baseband signal generator 107 is controlled to be doubled and gain PA of transmit power amplifiers 114 and 115 is controlled to ½ by the gain control signals of phase/amplitude correction sections 108 and 109.

As a result, it is possible to change gain PA of transmit power amplifiers 114 and 115 without changing the power values of signals sent by radio from antennas 102 and 103 and create a calibration table covering a wide range of gain PA by amplitude/phase characteristic storage sections 802 and 803.

(Embodiment 10)

Figure 13:
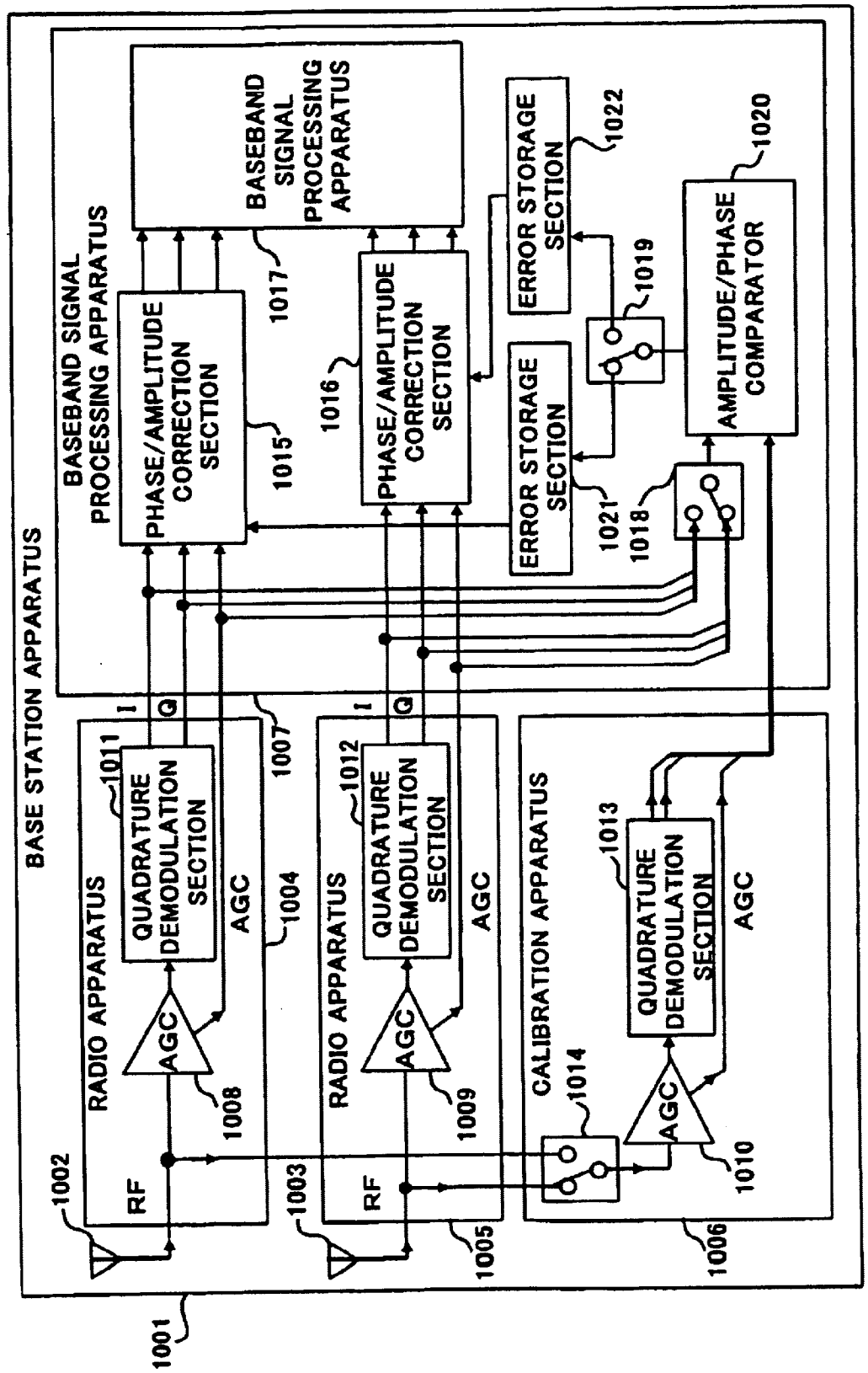
FIG. 13 is a block diagram showing a configuration on the receiving side of a base station apparatus according to Embodiment 10 of the present invention.

FIG. 13 is a block diagram showing a configuration on the receiving side of a base station apparatus according to Embodiment 10 of the present invention.

Base station apparatus 1001 shown in FIG. 13 has a configuration equipped with an array antenna made up of two antennas 1002 and 1003 and has a configuration equipped with radio apparatuses 1004 and 1005 with antennas 1002 and 1003 connected thereto, calibration apparatus 1006 and baseband signal processing apparatus 1007.

Radio apparatuses 1004 and 1005 and calibration apparatus 1006 have a same configuration except the provision of switch 1014 to connect AGC amplifier 1010 to either antenna 1002 or 1003 and have a configuration equipped with AGC amplifiers 1008, 1009 and 1010 and quadrature modulation sections 1011, 1012 and 1013, respectively.

Baseband signal processing apparatus 1007 has a configuration equipped with phase/amplitude correction sections 1015 and 1016, baseband signal processing section 1017, switches 1018 and 1019, amplitude/phase comparator 1020, and error storage sections 1021 and 1022.

Operation of base station apparatus 1001 in the above configuration will be explained below.

When a signal from the mobile station apparatus Is received or is being received, switches 1014, 1018 and 1019 are set. First, switch 1014 is set so that antenna 1002 is connected to AGC amplifier 1010, switch 1018 is set so that radio apparatus 1004 is connected to amplitude/phase comparator 1020 and switch 1019 is set so that amplitude/phase comparator 1020 is connected to phase/amplitude correction section 1015.

Operation in this case is as follows: First, a signal from the mobile station apparatus is received by antennas 1002 and 1003. The signal received by antenna 1003 is output to AGC amplifier 1008 of radio apparatus 1004 and at the same time output to AGC amplifier 1010 via switch 1014 and the amplitude of the signal is kept constant by auto-gain control amplification by AGC amplifiers 1008 and 1010.

In this case, the AGC signal indicating the result of auto-gain control is output through phase/amplitude correction section 1015 to baseband signal processing section 1017 on the radio apparatus 1004 side and at the same time output through switch 1018 to amplitude/phase comparator 1020, and output to amplitude/phase comparator 1020 on the calibration apparatus 1006 side.

The output signal of AGC amplifier 1008 is demodulated to a baseband signal made up of an Ich and Qch in quadrature demodulation section 1011 and this baseband signal is output through phase/amplitude correction section 1015 to baseband signal processing section 1017 and at the same time output through switch 1018 to amplitude/phase comparator 1020.

On the other hand, the output signal of AGC amplifier 1010 is demodulated to a baseband signal made up of an Ich and Qch in quadrature demodulation section 1013 and this baseband signal is output to amplitude/phase comparator 1020.

Amplitude/phase comparator 1020 compares the amplitude and phase between the output signal of radio apparatus 1004 and the output signal of calibration apparatus 1006, calculates amplitude and phase errors from this comparison and these errors are output to and stored in error storage section 1021 via switch 1019.

By the way, the output signals of radio apparatus 1004 and calibration apparatus 1006 are expressed by two kinds of signal, AGC signal and baseband signal, and amplitude/phase comparator 1020 calculates amplitude and phase errors through observation by combining the AGC signal and baseband signal.

After this storage, phase/amplitude correction section 1015 corrects the baseband signal and AGC signal of radio apparatus 1004 according to the errors stored in error storage section 1021. This correction is carried out by multiplying the baseband signal and AGC signal by complex coefficients that cancel out characteristic errors of radio apparatus 1004 and reflect the errors above.

This correction is also performed for the system of other radio apparatus 1005. In this case, switch 1014 is set so that antenna 1003 is connected to AGC amplifier 1010, switch 1018 is set so that radio apparatus 1005 is connected to amplitude/phase comparator 1020 and switch 1019 is set so that amplitude/phase comparator 1020 is connected to phase/amplitude correction section 1016.

Through this setting, the reception signal of antenna 1003 is output to AGC amplifier 1009 of radio apparatus 1005 and output through switch 1014 to AGC amplifier 1010 and amplified by auto-gain control by AGC amplifiers 1009 and 1010 so that the amplitude of the signal is kept constant.

In this case, on the radio apparatus 1005 side, the auto-gain-controlled AGC signal is output through phase/amplitude correction section 1016 to baseband signal processing section 1017 and at the same time output through switch 1018 to amplitude/phase comparator 1020 and on the calibration apparatus 1006 side output to amplitude/phase comparator 1020.

Furthermore, the output signal of AGC amplifier 1009 is demodulated to a baseband signal made up of an Ich and Qch in quadrature demodulation section 1012 and this baseband signal is output through phase/amplitude correction section 1016 to baseband signal processing section 1017 and at the same time output through switch 1018 to amplitude/phase comparator 1020.

On the other hand, the output signal of AGC amplifier 1010 is demodulated to a baseband signal made up of an Ich and Qch in quadrature demodulation section 1013 and this baseband signal is output to amplitude/phase comparator 1020.

Amplitude/phase comparator 1020 compares the amplitude and phase between the output signal of radio apparatus 1005 and the output signal of calibration apparatus 1006, calculates amplitude and phase errors from this comparison and these errors are output to and stored in error storage section 1022 via switch 1019.

After this storage, phase/amplitude correction section 1016 corrects the baseband signal and AGC signal of radio apparatus 1005 according to the errors stored in error storage section 1022. This correction is carried out by multiplying the baseband signal and AGC signal by complex coefficients that cancel out characteristic errors of radio apparatus 1005 and reflect the errors above.

In this way, amplitude and phase errors between the AGC signals and baseband signals output from radio apparatuses 1004 and 1005 and the AGC signal and baseband signal output from calibration apparatus 1006 are calculated. Then, the amplitude and phase of the auto-gain control signal and demodulated signal are corrected so that these errors are eliminated. By doing so, amplitude and phase shifts of the AGC signals and baseband signals output from radio apparatuses 1004 and 1005 can be corrected during a communication with the mobile station apparatus. Moreover, there is no need for providing an oscillation circuit for generating a calibration signal with a known information symbol necessary for correction as in the case of the prior art, and therefore it is possible to reduce the size and cost of the apparatus accordingly.

(Embodiment 11)

Figure 14:
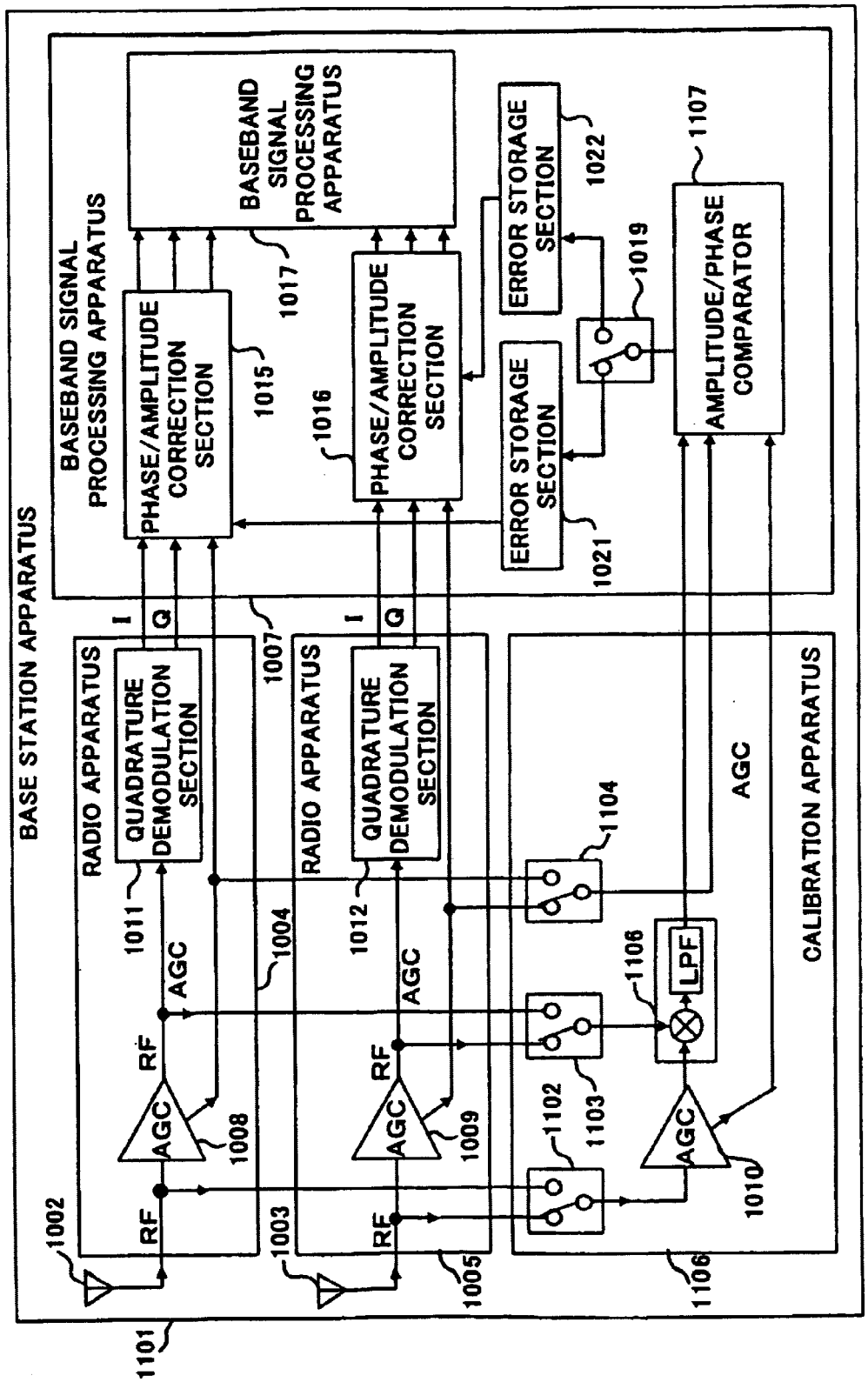
FIG. 14 is a block diagram showing a configuration on the receiving side of a base station apparatus according to Embodiment 11 of the present invention.

FIG. 14 is a block diagram showing a configuration on the receiving side of a base station apparatus according to Embodiment 11 of the presents invention. However, the components of base station apparatus 1101 in FIG. 14 common to those of base station apparatus 1001 in FIG. 13 are assigned the same reference numerals and explanations thereof will be omitted.

What base station apparatus 1101 shown in FIG. 14 differs from base station apparatus 1001 shown in FIG. 13 are the configurations of calibration apparatus 1006 and baseband signal processing apparatus 1007. Calibration apparatus 1006 has a configuration equipped with AGC amplifier 1010, switches 1102, 1103 and 1104, mixer 1105 and LPF 1106. Baseband signal processing apparatus 1007 has a configuration equipped with amplitude/phase comparator 1107, instead of amplitude/phase comparator 1020 in FIG. 13, which compares the amplitude and phase between the outputs of AGC amplifiers 1008 and 1009 of radio apparatuses 1004 and 1005 and the output of AGC amplifier 1010 and compares the amplitude and phase of the AGC signal.

Operation of base station apparatus 1101 in the above configuration will be explained below.

When a signal from the mobile station apparatus is received or is being received, base station apparatus 1101 sets switches 1102, 1103, 1104 and 1019. First, switch 1102 is set so that antenna 1002 is connected to AGC amplifier 1010. Switch 1103 is set so that the output side of AGC amplifier 1008 of radio apparatus 1004 is connected to mixer 1105. Switch 1104 is set so that the AGC signal output side of AGC amplifier 1008 of radio apparatus 1004 is connected to amplitude/phase comparator 1107. Switch 1019 is set so that amplitude/phase comparator 1107 is connected to phase/amplitude correction section 1015.

First, a signal from the mobile station apparatus is received by antennas 1002 and 1003. The signal received by antenna 1002 is output to AGC amplifier 1008 of radio apparatus 1004 and at the same time output to AGC amplifier 1010 via switch 1102 and the amplitude of the signal is kept constant by auto-gain control by AGC amplifiers 1008 and 1010.

In this case, the AGC signal indicating the result of auto-gain control is output through phase/amplitude correction section 1015 to baseband signal processing section 1017 on the radio apparatus 1004 side and at the same time output through switch 1104 to amplitude/phase comparator 1107, and output to amplitude/phase comparator 1107 on the calibration apparatus 1006 side.

The output signal of AGC amplifier 1008 is demodulated to a baseband signal made up of an Ich and Qch in quadrature demodulation section 1011 and this baseband signal is output through phase/amplitude correction section 1015 to baseband signal processing section 1017 and at the same time output through switch 1103 to mixer 1105.

On the other hand, the output signal of AGC amplifier 1010 is output to mixer 1105 and mixer 1105 mixes the output signals of AGC amplifiers 1108 and 1010. That is, through this mixing, the amplitude and phase differences between AGC amplifiers 1008 and 1010 are obtained.

Therefore, this mixed signal is output through LPF 1106 to amplitude/phase comparator 1107 and thereby amplitude/phase comparator 1107 calculates amplitude and phase errors between AGC amplifier 1008 and AGC amplifier 1010 and these errors are output to and stored in error storage section 1021 via switch 1019.

At the same time, amplitude/phase comparator 1107 compares the amplitude and phase between the AGC signal from radio apparatus 1104 and the AGC signal from calibration apparatus 1006, calculates amplitude and phase errors from this comparison and these errors are output to and stored in error storage section 1021 via switch 1019.

After this storage, phase/amplitude correction section 1015 corrects the baseband signal and AGC signal of radio apparatus 1004 according to the errors stored In error storage section 1021. This correction is carried out by multiplying the baseband signal and AGC signal by complex coefficients that cancel out characteristic errors of radio apparatus 1004 and reflect the errors above. This correction is also carried out in the system of other radio apparatus 1005.

In this way, amplitude and phase errors between the output signals of AGC amplifiers 1008 and 1009 and the output signal of AGC amplifier 1010 are detected and at the same time, the amplitude and phase errors of both auto-gain control signals are calculated. Then, the amplitude and phase of the auto-gain control signal and demodulated signal output from radio apparatuses 1004 and 1005 are corrected so that the characteristic errors between AGC amplifiers 1008 and 1009 corresponding to these errors are eliminated.

By doing so, amplitude and phase shifts of the AGC signals and baseband signals output from radio apparatuses 1004 and 1005 can be corrected during a communication with the mobile station apparatus. Moreover, there is no need for providing an oscillation circuit for generating a calibration signal with a known information symbol necessary for correction as in the case of the prior art, and therefore it is possible to reduce the size and cost of the apparatus accordingly.

(Embodiment 12)

Figure 15:
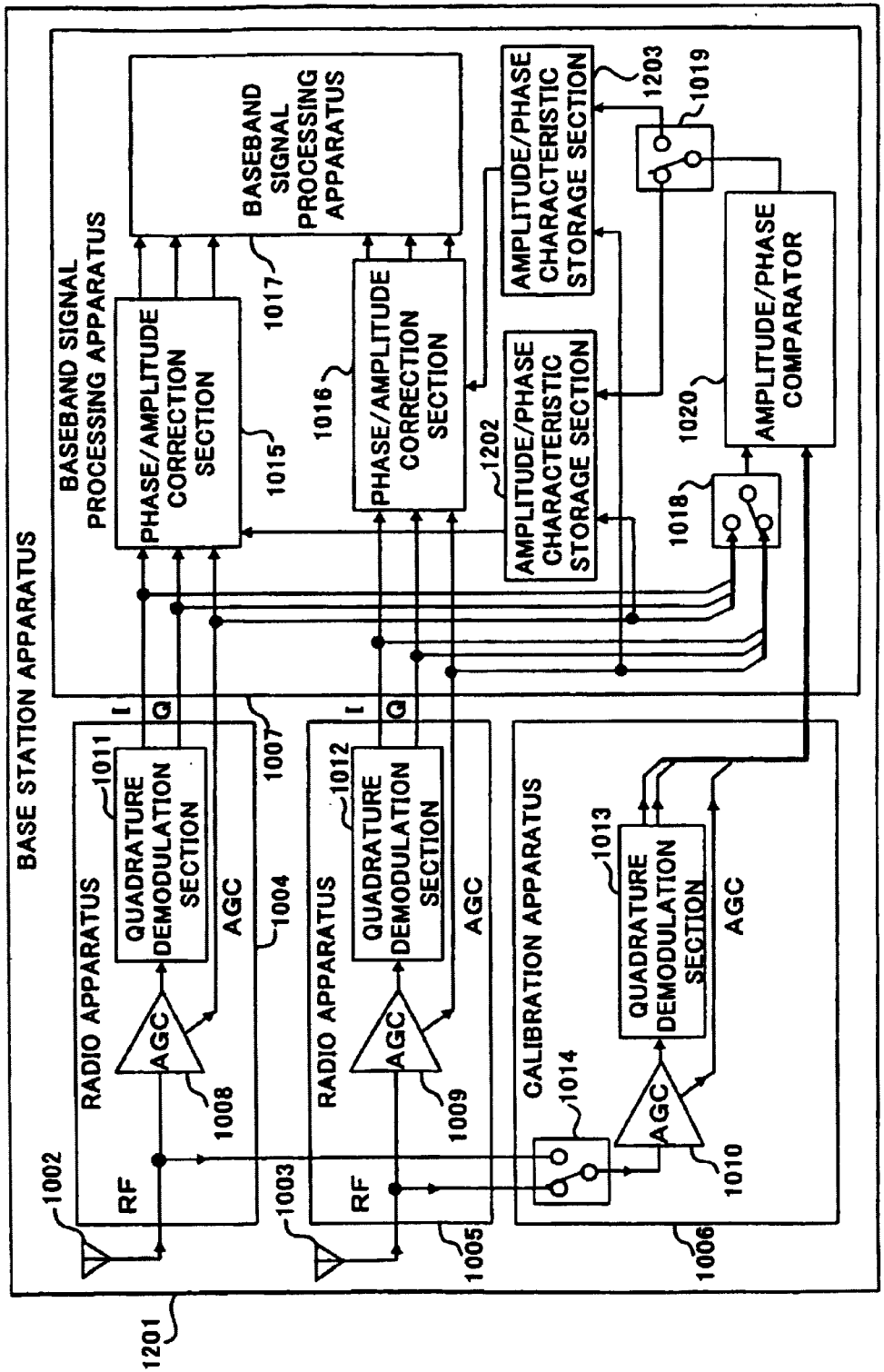
FIG. 15 is a block diagram showing a configuration on the receiving side of a base station apparatus according to Embodiment 12 of the present invention.

FIG. 15 is a block diagram showing a configuration lo on the receiving side of a base station apparatus according to Embodiment 12 of the present invention. The components of base station apparatus 1201 in FIG. 15 common to those of base station apparatus 1001 in FIG. 13 are assigned the same reference numerals as those in FIG. 13 and explanations thereof will be omitted.

Base station apparatus 1201 in FIG. 15 adopts a configuration with error storage sections 1021 and 1022 removed and amplitude/phase characteristic storage sections 1202 and 1203 added to base station apparatus 1001 in FIG. 13.

Amplitude/phase characteristic storage section 1202 stores in a calibration table, amplitude/phase characteristic Aè of the reception signal versus gain AGC of AGC amplifier 1008 based on the gain control signal output from AGC amplifier 1008 and the amplitude and phase errors that has been output from amplitude/phase comparator 1020 and passed through switch 1019.

Likewise, amplitude/phase characteristic storage section 1203 stores in a calibration table, amplitude/phase characteristic Aè of the reception signal versus gain AGC of AGC amplifier 1009 based on the gain control signal output from AGC amplifier 1009 and the amplitude and phase errors that has been output from amplitude/phase comparator 1020 and passed through switch 1019.

By the way, gain AGC of AGC amplifiers 1008 and 1009 slightly varies during a communication, and therefore amplitude/phase characteristic storage sections 1202 and 1203 update the contents of the calibration table based on the measured gain AGC at any time.

Phase/amplitude correction sections 1015 and 1016 correct the gain control signals based on the content of the calibration table written in their respective amplitude/phase characteristic storage sections 1202 and 1203. Gain AGCs, which were not measured in past communications, are estimated based on the gain AGCs that have been measured so far.

Thus, by creating a calibration table indicating the relationship of amplitude/phase characteristic Aè of the reception signal versus each gain AGC and using the calibration table to correct gain control signals, it is possible to carry out phase/amplitude corrections taking into consideration the amplitude/phase characteristic of the reception signal without stopping communication.

(Embodiment 13)

Figure 16:
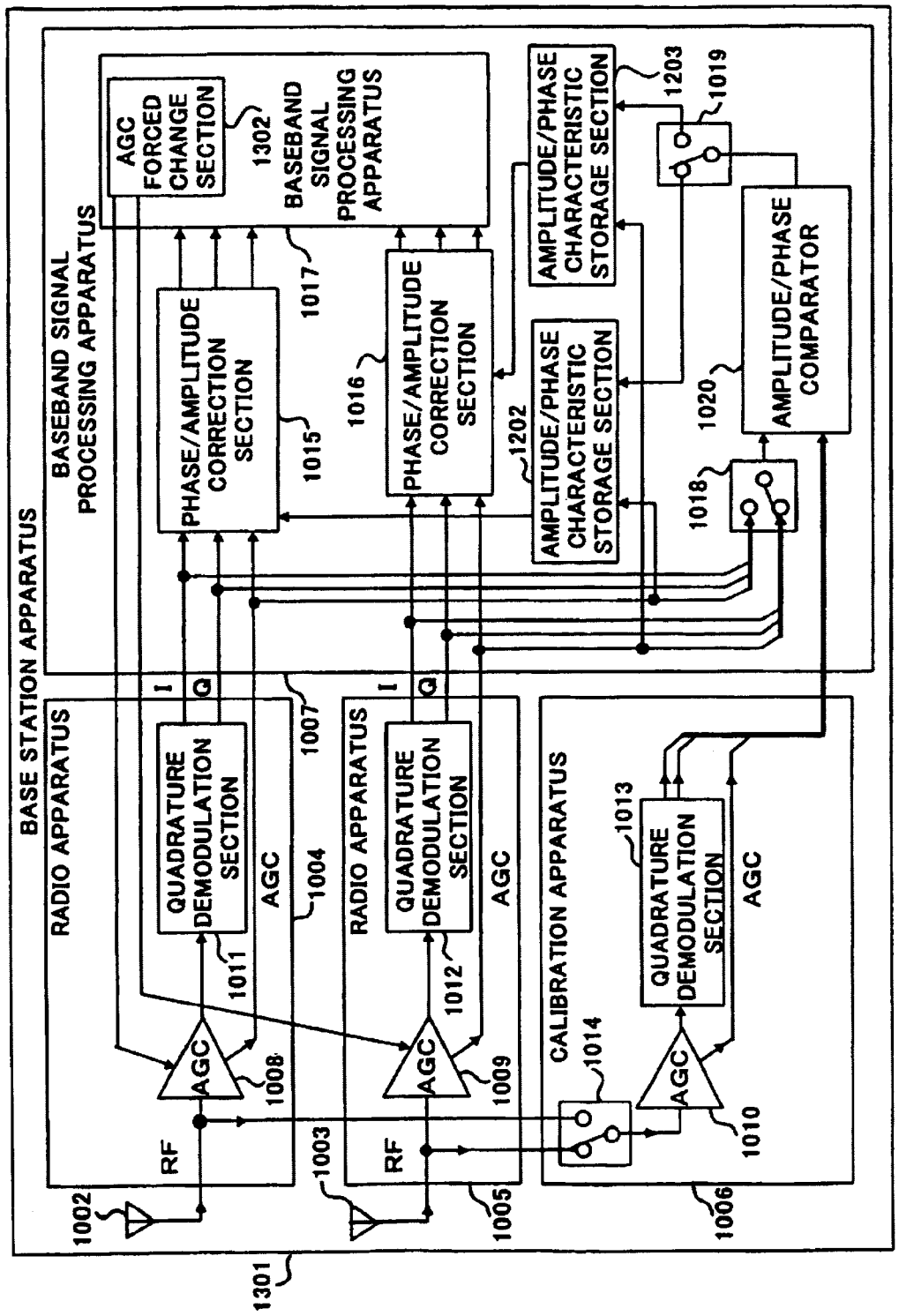
FIG. 16 is a block diagram showing a configuration on the receiving side of a base station apparatus according to Embodiment 13 of the present invention.

FIG. 16 is a block diagram showing a configuration on the receiving side of a base station apparatus according to Embodiment 13 of the present invention. However, the components of base station apparatus 1301 in FIG. 16 common to those of base station apparatus 1201 in FIG. 15 are assigned the same reference numerals as those in FIG. 15 and explanations thereof will be omitted.

Base station apparatus 1301 shown in FIG. 16 adopts a configuration with AGC gain forced change section 1302 added to base station apparatus 1201 In FIG. 15.

AGC gain forced change section 1302 forcibly changes gain AGC of AGC amplifier 1008 to a predetermined variation width.

For example, in the case where AGC gain forced change section 1302 control a variation width of AGC gain forced change section 1302 to ½, the power value of the input signal of baseband signal processing section 1017 is controlled to be doubled.

As a result, it is possible to change gain AGC of AGC amplifiers 1008 and 1009 without changing the power values of signals received by radio from antennas 1002 and 1003 and create a calibration table with respect to a wide-range gain AGC by amplitude/phase characteristic storage sections 1202 and 1203.

(Embodiment 14)

Figure 17:
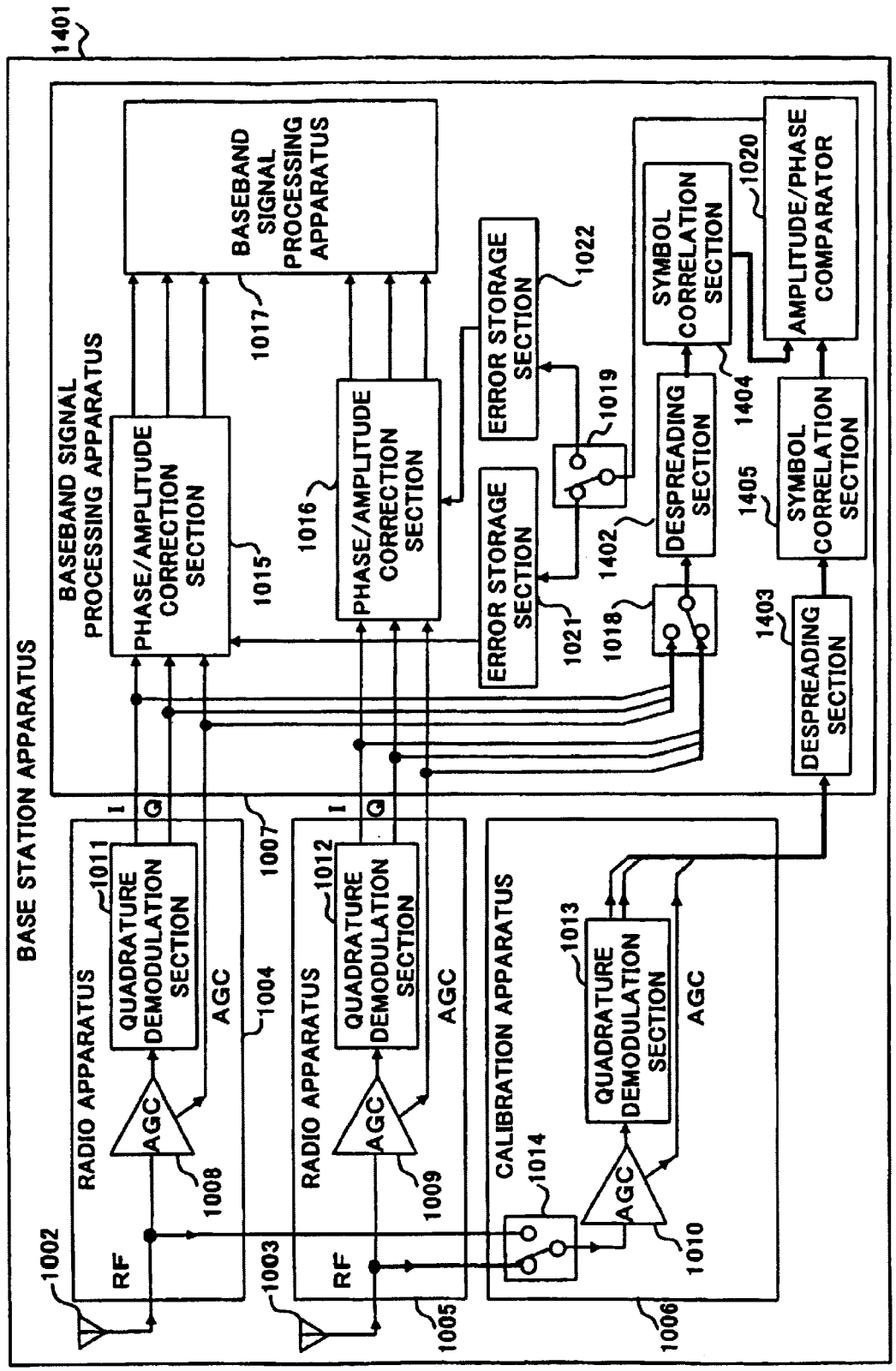
FIG. 17 is a block diagram showing a configuration on the receiving side of a base station apparatus according to Embodiment 14 of the present invention.

FIG. 17 is a block diagram showing a configuration on the receiving side of a base station apparatus according to Embodiment 14 of the present invention. However, the components of base station apparatus 1401 in FIG. 17 common to those of base station apparatus 1001 in FIG. 13 are assigned the same reference numerals as those in FIG. 13 and explanations thereof will be omitted.

Base station apparatus 1401 shown in FIG. 17 adopts a configuration with despreading sections 1402 and 1403 and symbol correlation sections 1404 and 1405 added to base station apparatus 1001 in FIG. 13.

Switch 1018 outputs either one of the output signal of quadrature modulation section 1011 or quadrature modulation section 1012 to despreading section 1402. The output signal of calibration radio apparatus 1006 is input to despreading section 1403.

Despreading section 1402 performs despreading processing on the signal input and outputs to symbol correlation section 1404. Despreading section 1403 performs despreading processing on the signal input and outputs to symbol correlation section 1405.

Symbol correlation section 1404 performs symbol correlation processing, that is, multiplying the output signal of despreading section 1402 by symbol information data so as to cancel out the information modulation component and then averaging the multiplication result. Symbol correlation section 1405 performs symbol correlation processing, that is, multiplying the output signal of despreading section 1403 by symbol information data so as to cancel out the information modulation component and then averaging the multiplication result.

Here, in the case where the symbol information data is known to the base station apparatus, the known data is used, and in the case where the symbol information data is unknown to the base station apparatus, a code decision value of the despread output is used instead of the symbol information data.

Amplitude/phase comparator 1020 compares the amplitude and phase between the output signal of symbol correlation section 1404 and the output signal of symbol correlation section 1405, and calculates amplitude and phase errors from this comparison.

Thus, by applying symbol correlation operation to the reception signal, it is possible to enhance an SN ratio of the signal subject to amplitude/phase comparison and improve the calibration accuracy.

(Embodiment 15)

Figure 18:
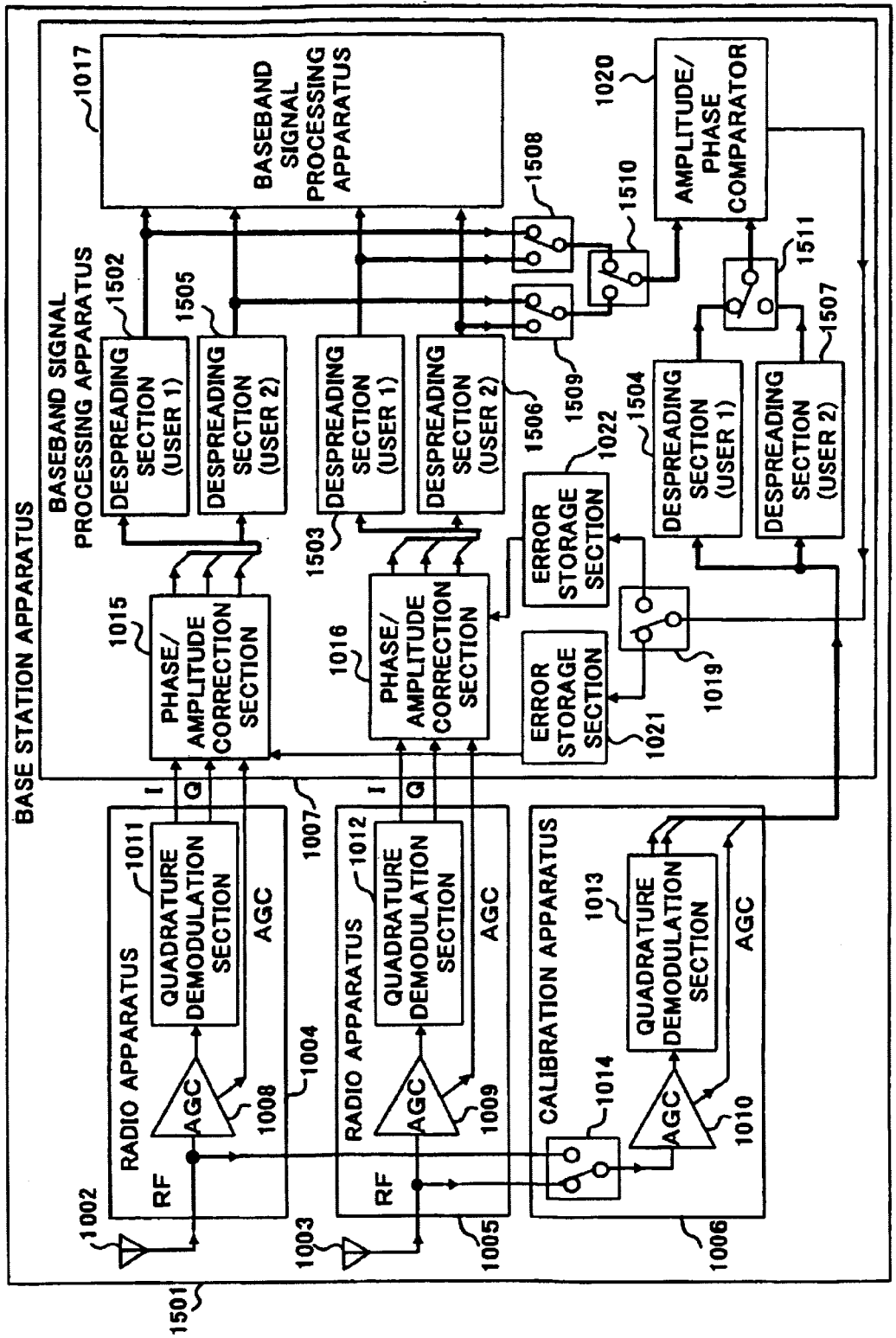
FIG. 18 is a block diagram showing a configuration on the receiving side of a base station apparatus according to Embodiment 15 of the present invention.

FIG. 18 is a block diagram showing a configuration on the receiving side of a base station apparatus according to Embodiment 15 of the present invention. However, the components of base station apparatus 1501 in FIG. 18 common to those of base station apparatus 1001 in FIG. 13 are assigned the same reference numerals as those in FIG. 13 and explanations thereof will be omitted.

Base station apparatus 1501 shown in FIG. 18 adopts a configuration with switch 1018 removed from and despreading sections 1502, 1503, 1504, 1505, 1506 and 1507,and switches 1508, 1509, 1510 and 1511 added to base station apparatus 1001 in FIG. 13.

The output signal of phase/amplitude correction section 1015 is input to despreading section 1502 and despreading section 1505. The output signal of phase/amplitude correction section 1016 is input to despreading section 1503 and despreading section 1506. The output signal of calibration radio apparatus 1006 is input to despreading sections 1504 and 1507.

Despreading section 1502 and despreading section 1503 each perform despreading processing on their respective signals input using a spreading code for user 1 and output to switch 1508. Despreading section 1504 performs despreading processing on the signal input using a spreading code for user 1 and outputs to switch 1511.

Despreading section 1505 and despreading section 1506 each perform despreading processing on their respective signals input using a spreading code for user 2 and output to switch 1509. Despreading section 1507 performs despreading processing on the signal input using a spreading code for user 2 and outputs to switch 1511.

Switch 1508 outputs either one of the output signal of despreading section 1502 or despreading section 1503 to switch 1510. Switch 1509 outputs either one of the output signal of despreading section 1505 or despreading section 1506 to switch 1510.

In the case where switch 1019 is connected to phase/amplitude correction section 1015, switch 1510 outputs the output signal of switch 1508 to phase/amplitude comparator

1020, and in the case where switch 1019 is connected to phase/amplitude correction section 1016, switch 1510 outputs the output signal of switch 1509 to phase/amplitude comparator 1020.

In the case where switch 1019 is connected to phase/amplitude correction section 1015, switch 1511 outputs the output signal of despreading section 1504 to phase/amplitude comparator 1020, and in the case where switch 1019 is connected to phase/amplitude correction section 1016, switch 1511 outputs the output signal of despreading section 1507 to phase/amplitude comparator 1020.

Phase/amplitude comparator 1020 compares the amplitude and phase of the signal, which has been output from despreading section 1504 and has passed through switch 1511 and the signal, which has been output from despreading section 1502 or despreading section 1503 and has passed through switch 1508 and switch 1510 and calculates amplitude and phase errors from this comparison.

Furthermore, phase/amplitude comparator 1020 compares the amplitude and phase of the signal, which has been output from despreading section 1507 and has passed through switch 1511 and the signal, which has been output from despreading section 1505 or despreading section 1506 and has passed through switch 1509 and switch 1510 and calculates amplitude and phase errors from this comparison.

Then, phase/amplitude comparator 1020 compares the error obtained based on the output signal of despreading section 1502 and the error obtained based on the output signal of despreading section 1505 and outputs the one with a smaller value to error storage section 1021 via switch 1019.

Likewise, phase/amplitude comparator 1020 compares the error obtained based on the output signal of despreading section 1503 and the error obtained based on the output signal of despreading section 1506 and outputs the one with a smaller value to error storage section 1022 via switch 1019.

Thus, by selecting as the amplitude/phase measurement target, the one with a good reception condition from among a plurality of user reception signals, it is possible to improve the level of reliability in amplitude/phase measurement.

By the way, in Embodiment 15, as in the case of Embodiment 14, by applying symbol correlation operation, that is, multiplying the output signal of each despreading section by symbol information data so as to cancel out the information modulation component and then averaging the multiplication result, it is possible to enhance an SN ratio of the signal subject to amplitude/phase comparison and improve the calibration accuracy.

Embodiment 15 describes a case where two users are selected as the amplitude/phase measurement targets, but the present invention is not limited to this and it is also possible to select from among three or more users as the amplitude/phase measurement targets.

(Embodiment 16)

Figure 19:
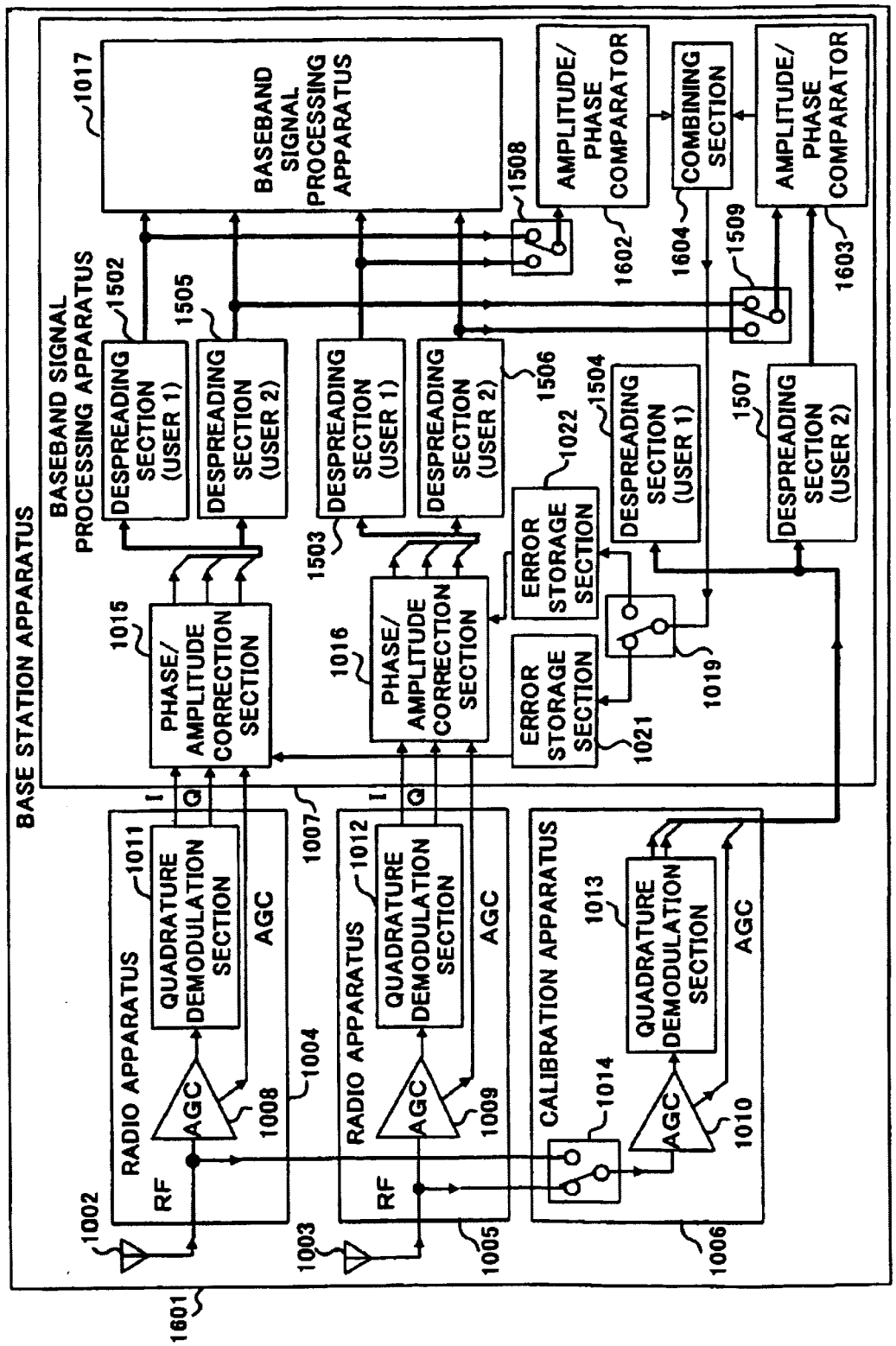
FIG. 19 is a block diagram showing a configuration on the receiving side of a base station apparatus according to Embodiment 16 of the present invention.

FIG. 19 is a block diagram showing a configuration on the receiving side of a base station apparatus according to Embodiment 16 of the present invention. However, the components of base station apparatus 1601 in FIG. 19 common to those of base station apparatus 1501 in FIG. 18 are assigned the same reference numerals as those in FIG. 18 and explanations thereof will be omitted.

Base station apparatus 1601 in FIG. 19 adopts a configuration with switches 1510 and 1511 and amplitude/phase comparator 1020 removed and phase/amplitude comparators 1602 and 1603 and combining section 1604 added to based station apparatus 1501 in FIG. 18.

Despreading section 1504 performs despreading processing on the signal input using a spreading code for user 1 and output to phase/amplitude comparator 1602. Despreading section 1507 performs despreading processing on the signal input using a spreading code for user 2 and output to phase/amplitude comparator 1603.

Switch 1508 outputs either one of the output signal of despreading section 1502 or despreading section 1503 to phase/amplitude comparator 1602. Switch 1509 outputs either one of the output signal of despreading section 1505 or despreading section 1506 to phase/amplitude comparator 1603.

Phase/amplitude comparator 1602 compares the amplitude and phase between the signal output from despreading section 1504 and the signal, which has been output from despreading section 1502 or despreading section 1503 and has passed through switch 1508, calculates amplitude and phase errors from this comparison and outputs to combining section 1604.

Phase/amplitude comparator 1603 compares the amplitude and phase between the signal output from despreading section 1507 and the signal, which has been output from despreading section 1505 or despreading section 1506 and has passed through switch 1509, calculates amplitude and phase errors from this comparison and outputs to combining section 1604.

Combining section 1604 combines the error obtained based on the output signal of despreading section 1502 and the error obtained based on the output signal of despreading section 1505 and outputs the combined value through switch 1019 to error storage section 1021.

Furthermore, combining section 1604 combines the error obtained based on the output signal of despreading section 1503 and the error obtained based on the output signal of despreading section 1506 and outputs the combined value through switch 1019 to error storage section 1022.

Thus, by carrying out amplitude/phase measurement on reception signals of a plurality of users and combining the measurement results, it is possible to improve the level of reliability of amplitude/phase measurement.

By the way, in Embodiment 16, as in the case of Embodiment 14, by applying symbol correlation operation, that is, multiplying the output of each despreading section by symbol information data so as to cancel out the information modulation component and then averaging the multiplication result, it is possible to enhance an SN ratio of the signal subject to amplitude/phase comparison and improve the calibration accuracy.

Embodiment 16 describes a case where two users are selected as the targets for combining amplitude/phase measurement results, but the present invention is not limited to this and it is also possible to select from among three or more users as the targets for combining amplitude/phase measurement results.

The embodiments above describe a case where an array antenna is formed with two antennas, but the present invention places no restrictions on the number of antennas that form an array antenna.

As is apparent from the above explanations, the present invention can correct amplitude and phase shifts of a transmission signal or reception signal without interrupting communications with other apparatuses, making it possible to reduce the size and cost of the apparatus.

This application is based on the Japanese Patent Application No. HEI 11-149252 filed on May 28, 1999 and the Japanese Patent Application No. HEI 11-375259 filed on Dec. 28, 1999, entire content of which is expressly incorporated by reference herein.

INDUSTRIAL APPLICABILITY

The present invention is ideally applicable to a base station apparatus equipped with an array antenna in a mobile communication system.

What is claimed is:

1. A communication apparatus that transmits a signal with a directivity using an array antenna comprising a plurality of antennas, said communication apparatus comprising:
    a generator that generates, on a per antenna basis, a transmission signal and a gain control signal for controlling a gain of the transmission signal;
    a plurality of amplifiers that are disposed in one-to-one correspondence with said plurality of antennas and that each amplify the transmission signal with a gain in accordance with the gain control signal;
    an attenuator that attenuates an output signal of the amplifiers;
    an error detector that calculates an input-output error of the amplifiers from an input signal to the amplifiers and an output signal of the attenuator; and
    a plurality of correctors that are disposed in one-to-one correspondence with said plurality of antennas and that each correct the transmission signal and the gain control signal generated by the generator so as to eliminate the error.

2. The communication apparatus according to claim 1, wherein the error detector calculates a phase difference between an input signal and an output signal of an amplifier and a difference between an amplitude difference between the input signal and the output signal of the amplifier and an expected value as an input-output error of the amplifier.

3. The communication apparatus according to claim 1, further comprising:
    a radio frequency modulator that modulates the transmission signal generated by the generator to a radio frequency and outputting to an amplifier,
    wherein the error detector calculates a phase difference between the input signal of said radio frequency modulator and the output signal of said amplifier and a difference between an amplitude difference between the input signal of said radio frequency modulator and the output signal of said amplifier, and an expected value as an input-output error of said amplifier.

4. The communication apparatus according to claim 1, further comprising:
    a quadrature modulator with an analog element structure that quadrature-modulates the transmission signal generated by the generator,
    wherein the error detector calculates a phase difference between the input signal of said quadrature modulator and the output signal of said amplifier and a difference between an amplitude difference between the input signal of said quadrature modulator and the output signal of said amplifier, and an expected value as an input-output error of said amplifier.

5. The communication apparatus according to claim 1, further comprising:
    a first frequency converter that converts signals used to calculate an input-output error of the amplifier to a same low frequency,
    wherein the error detector calculates an input-output error of said amplifier from the output signal of said first frequency converter.

6. The communication apparatus according to claim 1, further comprising:
    a second frequency converter that converts a signal to a low frequency; and
    a first switch that sequentially outputs signals used to calculate an input-output error of the amplifier to said second frequency converter,
    wherein the error detector calculates an input-output error of said amplifier from the output signal of said second frequency converter.

7. The communication apparatus according to claim 1, further comprising:
    a first mixer that mixes the output signal and input signal of the amplifier,
    wherein the error detector detects an input-output error of said amplifier from the output signal of said first mixer.

8. The communication apparatus according to claim 1, further comprising:
    a radio frequency modulator that modulates the transmission signal generated by the generator to a radio frequency and outputting to the amplifier;
    a second mixer that mixes the input signal of said radio frequency modulator and the output signal of said amplifier; and
    a third frequency converter that converts the frequency of the output signal of said second mixer to 0,
    wherein the error detector detects an input-output error of said amplifier from the output signal of said third frequency converter.

9. The communication apparatus according to claim 1, further comprising:
    an attenuator that attenuates the output signal of the amplifier according to a gain control signal,
    wherein the error detector calculates an input-output error of said amplifier using the signal attenuated by said attenuator.

10. The communication apparatus according to claim 1, further comprising:
    a plurality of amplifiers and antennas that emit the output signals of the amplifiers,
    wherein when the generator generates transmission signals and gain control signals corresponding to said amplifiers, said plurality of antennas multiply said transmission signals and gain control signals by coefficients to form a directivity.

11. The communication apparatus according-to claim 10, further comprising a switch that sequentially outputs signals used to calculate an input-output error of the amplifier to the error detector.

12. The communication apparatus according to claim 1, wherein the corrector converts a corrected transmission signal and gain control signal to an analog signal and the error detector converts the input signal to a digital signal.

13. The communication apparatus according to claim 1, further comprising:
    an amplitude/phase characteristic storage that stores the amplitude/phase characteristic of the transmission signal versus the gain of the amplifier based on the output signal and gain control signal of the error detector in a calibration table,
    wherein the corrector corrects the transmission signal and gain control signal based on the content of said calibration table.

14. The communication apparatus according to claim 13, further comprising a forced changer that forcibly changes a power value and an amplification value of the transmission signal generated by the generator so that a product of said power value and said amplification value becomes a predetermined value.

15. A communication apparatus that receives a signal with a directivity from an array antenna comprising a plurality of antennas, said communication apparatus comprising:
   a same number of radio apparatuses that each amplify a reception signal to a fixed amplitude by auto-gain control and quadrature-modulate the amplified signal;
   a calibration apparatus in a same configuration as that of the radio apparatuses;
   an error detector that calculates amplitude and phase errors between auto-gain control signals and demodulated signals output from said radio apparatuses and an auto-gain control signal and demodulated signal output from said calibration apparatus; and
   a corrector that corrects the amplitude and phase of said auto-gain control signals and demodulated signals output from said radio apparatuses so as to eliminate said errors.

16. The communication apparatus according to claim 15, further comprising:
   an amplitude/phase characteristic storage that stores amplitude/phase characteristics of the reception signal with respect to the gain of the amplifier in a calibration table based on the output signal and auto-gain control signal of the error detector,
   wherein the corrector corrects the demodulated signal and auto-gain control signal based on the content of said calibration table.

17. The communication apparatus according to claim 16, further comprising a forced changer that forcibly changes a power value and an amplification value of the demodulated signal corrected by the corrector so that a product of said power value and said amplification value becomes a predetermined value.

18. The communication apparatus according to claim 15, further comprising:
   a first despreader that performs despreading processing on each auto-gain control signal and demodulated signal output from each of a plurality of radio apparatuses;
   a second despreader that performs despreading processing on the auto-gain control signal and demodulated signal output from the calibration apparatus;
   a first symbol correlator that finds a symbol correlation value of the output signal of said first despreader; and
   a second symbol correlator that finds a symbol correlation value of the output signal of said second despreader,
   wherein said detector calculates amplitude and phase errors between the output signal of said first symbol correlator and the output signal of said second symbol correlator.

19. The communication apparatus according to claim 15, further comprising:
   a third despreader that performs despreading processing on the auto-gain control signal and demodulated signal output from each of a plurality of radio apparatuses for each user; and
   a fourth despreader that performs despreading processing on the auto-gain control signal and demodulated signal output from the calibration apparatus for each user,
   wherein the error detector calculates amplitude and phase errors between the output signal of said third despreader and the output signal of said fourth despreader on each radio apparatus for each user and selects the errors of the user with the optimal condition for each radio apparatus.

20. The communication apparatus according to claim 19, further comprising:
   a third symbol correlator that finds a symbol correlation value of the output signal of the third despreader; and
   a fourth symbol correlator that finds a symbol correlation value of the output signal of the fourth despreader,
   wherein the error detector calculates amplitude and phase errors between the output signal of said third symbol correlator and the output signal of said fourth symbol correlator.

21. The communication apparatus according to claim 15, further comprising:
   a third despreader that performs despreading processing on the auto-gain control signal and demodulated signal output from each of a plurality of radio apparatuses for each user; and
   a fourth despreader that performs despreading processing on the auto-gain control signal and demodulated signal output from the calibration apparatus for each user,
   wherein the error detector calculates amplitude and phase errors between the output signal of said third despreader and the output signal of said fourth despreader on each radio apparatus for each user and combines errors of all users for each radio apparatus.

22. A communication apparatus comprising:
   a plurality of radio apparatuses that amplify a reception signal to a fixed amplitude by auto-gain control and quadrature-modulate the amplified signal;
   a calibration apparatus that amplifies said reception signal to a fixed amplitude by auto-gain control and mixes this amplified signal with a signal amplified by any one of said radio apparatuses;
   an error detector that calculates amplitude and phase errors between the signal amplified by each of said radio apparatuses and the signal amplified by said calibration apparatus based on said mixed signal and calculating amplitude and phase errors between the auto-gain control signal output from each of said radio apparatuses and the auto-gain control signal output from said calibration apparatus; and
   a corrector that corrects the amplitude and phase of the auto-gain control signal and demodulated signal output from each of said radio apparatuses so as to eliminate said errors.

23. A base station apparatus comprising a communication apparatus that transmits a signal with a directivity using an array antenna comprising a plurality of antennas, said communication apparatus comprising:
   a generator that generates, on a per antenna basis, a transmission signal and a gain control signal for controlling a gain of the transmission signal;
   a plurality of amplifiers that are disposed in one-to-one correspondence with said plurality of antennas and that each amplify the transmission signal with a gain in accordance with the gain control signal;
   an attenuator that attenuates an output signal of the amplifiers;
   an error detector that calculates an input-output error of the amplifiers from an input signal to the amplifiers and an output signal of the attenuator; and
   a plurality of correctors that are disposed in one-to-one correspondence with said plurality of antennas and that each correct the transmission signal and the gain control signal generated by the generator so as to eliminate the error.

24. A base station apparatus comprising a communication apparatus, said communication apparatus comprising:
- a radio apparatuses that amplify a reception signal to a fixed amplitude by auto-gain control and quadrature-modulate the amplified signal;
- a calibration apparatus in a same configuration, as that of these radio apparatuses;
- an error detector that calculates amplitude and phase errors between the auto-gain control signal and demodulated signal output from said radio apparatuses and the auto-gain control signal and demodulated signal output from said calibration apparatus; and
- a corrector that corrects the amplitude and phase of said auto-gain control signal and demodulated signal output from each of said radio apparatuses.

25. A communication method in a communication apparatus that transmits a signal with a directivity using an array antenna comprising a plurality of antennas, said communication method comprising the steps of:
- generating a transmission signal and a gain control signal for controlling a gain of the transmission signal on a per antenna basis;
- in a same number of amplifiers as the antennas, amplifying the transmission signal with a gain in accordance with the gain control signal;
- in an attenuator, attenuating an output signal of the amplifiers;
- calculating an input-output error of the amplifiers from an input signal to the amplifiers and an output signal of the attenuator; and
- correcting the transmission signal and the gain control signal so as to eliminate the error.

26. A communication method in a communication apparatus that receives a signal with a directivity using an array antenna comprising a plurality of antennas, said communication method comprising the steps of:
- in a same number of radio apparatuses as the antennas, amplifying a reception signal to a fixed amplitude by auto-gain control and quadrature-modulating the amplified signal;
- in a calibration apparatus in a same configuration as that of the radio apparatus, performing calibration;
- calculating amplitude and phase errors between auto-gain control signals and demodulated signals output from said radio apparatuses and an auto-gain control signal and demodulated signal output from said calibration apparatus; and
- correcting the amplitude and phase of said auto-gain control signals and demodulated signals output from said radio apparatuses so as to eliminate said errors.

* * * * *